(12) United States Patent
Ueno et al.

(10) Patent No.: US 8,321,111 B2
(45) Date of Patent: Nov. 27, 2012

(54) PEDAL SYSTEM AND VEHICLE SYSTEM WITH THE PEDAL SYSTEM

(75) Inventors: Kentaro Ueno, Astugi (JP); Mitsuhide Sasaki, Isehara (JP)

(73) Assignee: Hitachi, Ltd., Tokyo (JP)

( * ) Notice: Subject to any disclaimer, the term of this patent is extended or adjusted under 35 U.S.C. 154(b) by 1826 days.

(21) Appl. No.: 11/354,941

(22) Filed: Feb. 16, 2006

(65) Prior Publication Data
US 2006/0219047 A1 Oct. 5, 2006

(30) Foreign Application Priority Data
Mar. 31, 2005 (JP) ................................ 2005-100351

(51) Int. Cl.
*G06F 7/70* (2006.01)
(52) U.S. Cl. ............... 701/70; 701/48; 701/77; 701/79; 701/83; 303/11; 303/113.4; 303/155
(58) Field of Classification Search .................... 701/36, 701/76, 83, 48, 70, 77, 79; 303/113.4, 155, 303/11
See application file for complete search history.

(56) References Cited

U.S. PATENT DOCUMENTS
| | | | | |
|---|---|---|---|---|
| 6,315,371 | B1* | 11/2001 | Wachi et al. | 303/155 |
| 2004/0080405 | A1* | 4/2004 | Hijikata | 340/435 |
| 2005/0046273 | A1* | 3/2005 | Jung et al. | 303/113.4 |

FOREIGN PATENT DOCUMENTS
| | | |
|---|---|---|
| DE | 198 32 036 A1 | 1/1999 |
| DE | 10 2004 027 499 A1 | 12/2005 |
| EP | 1 253 053 A2 | 10/2002 |
| JP | 11-291894 A | 10/1999 |
| JP | 2000-142369 | 5/2000 |

OTHER PUBLICATIONS

European Search Report dated Aug. 22, 2006 (Ten (10) pages).

* cited by examiner

*Primary Examiner* — Redhwan K Mawari
(74) *Attorney, Agent, or Firm* — Crowell & Moring LLP

(57) ABSTRACT

A pedal system to realize an intended vehicle output in response to pedal depression is provided. The pedal system provides hysteresis in the relationship between the pedal effort and the vehicle output, taking into account a pedal effort in a depressing motion or in a releasing motion, employing a relationship including a straight line or a folded line. A vehicle output command may be delivered by changing the vehicle output relative to the pedal effort depending on the vehicle speed. An appropriate vehicle output command may be delivered by providing a maintaining motion in addition to the depressing motion and the releasing motion with a different pedal effort and vehicle output command relationship, and by changing the sensitivity of the vehicle output command relative to the pedal effort in the maintaining motion depending on the pedal effort-increasing/decreasing direction, vehicle information, and the vehicle output command or the pedal effort.

24 Claims, 19 Drawing Sheets

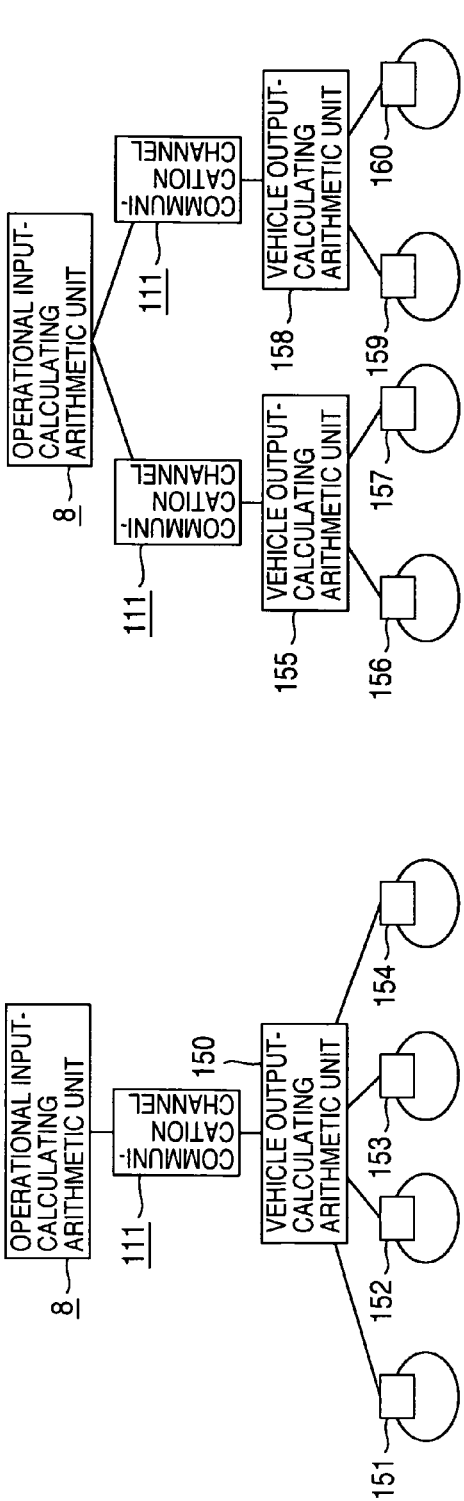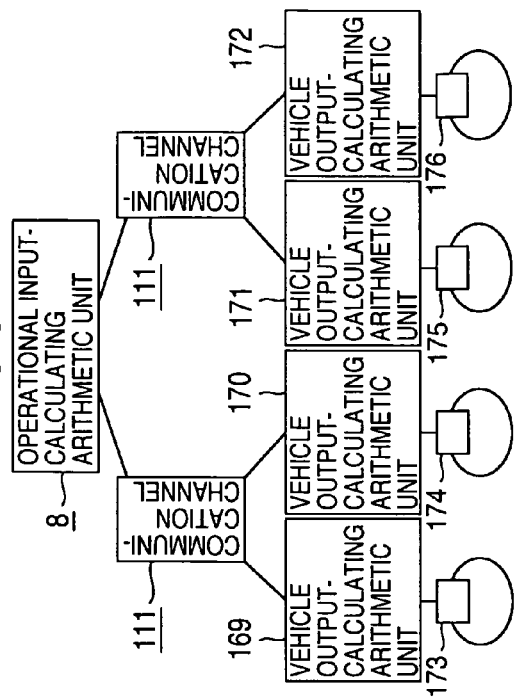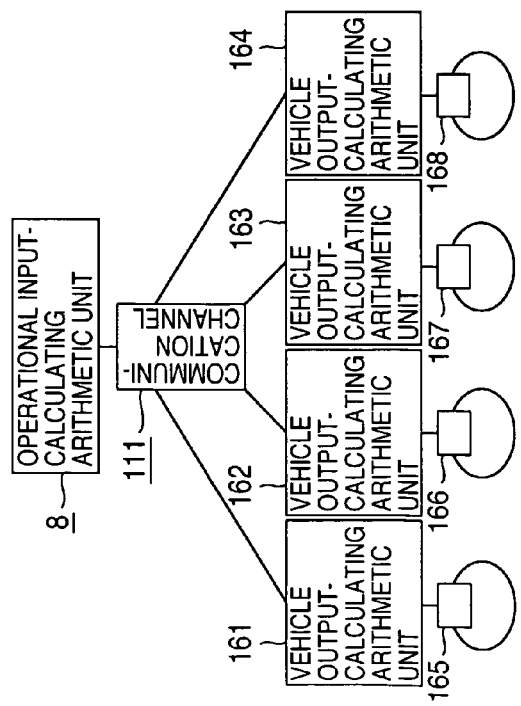

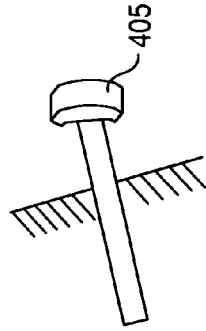
FIG.4C
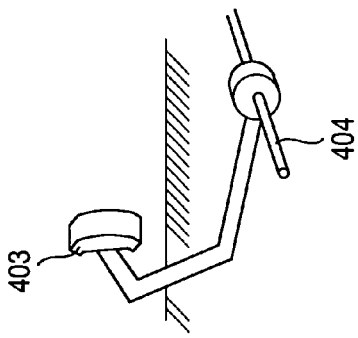
FIG.4B
FIG.4E
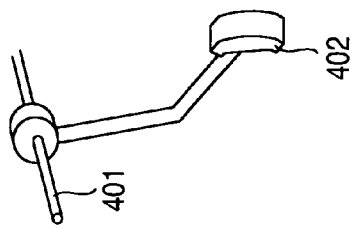
FIG.4A
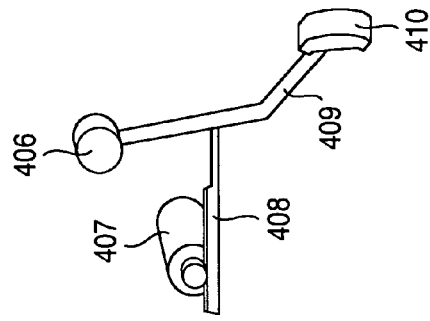
FIG.4D
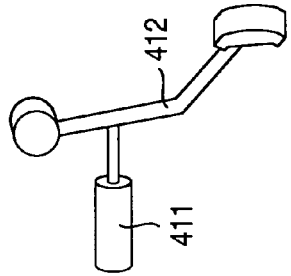

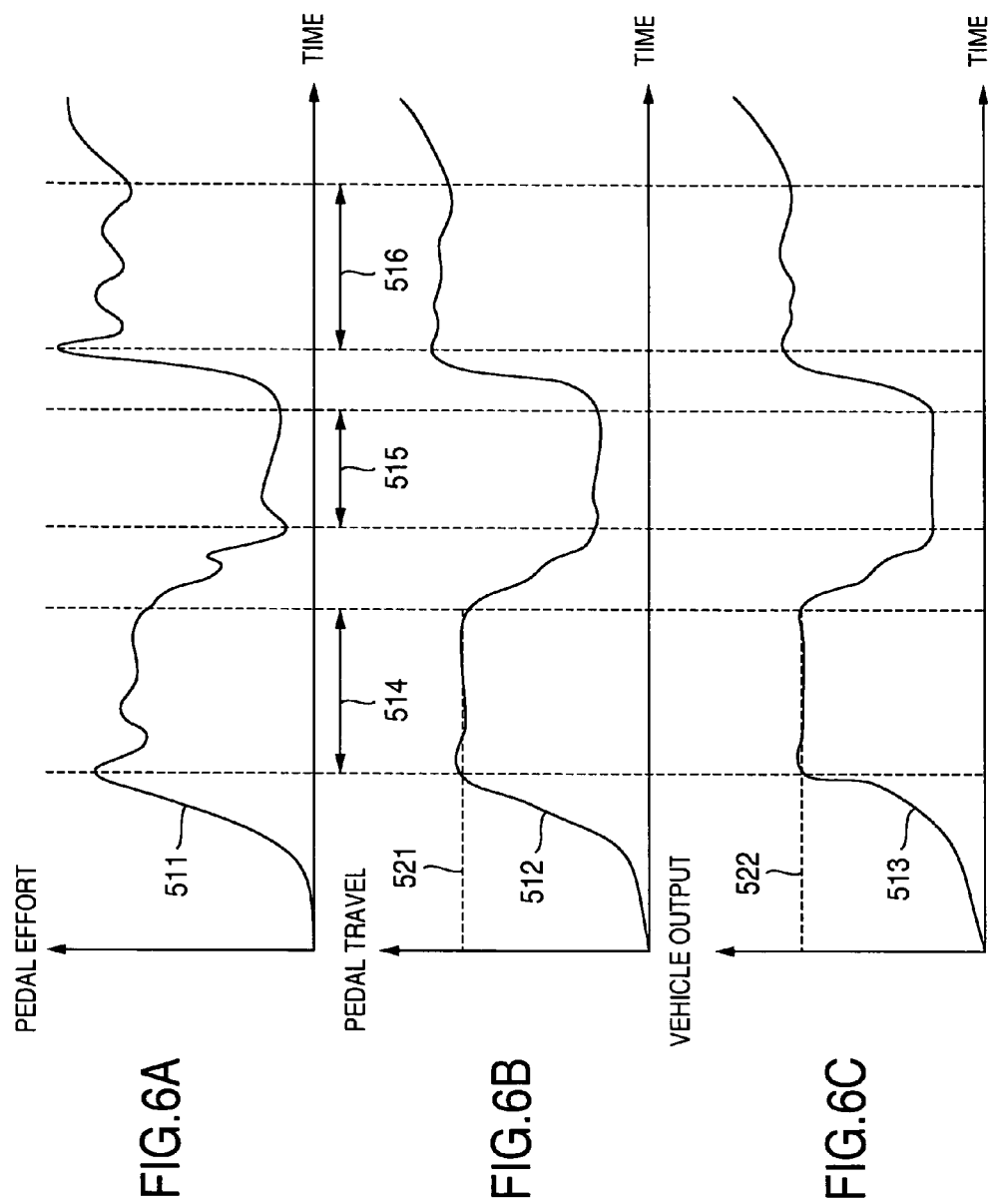

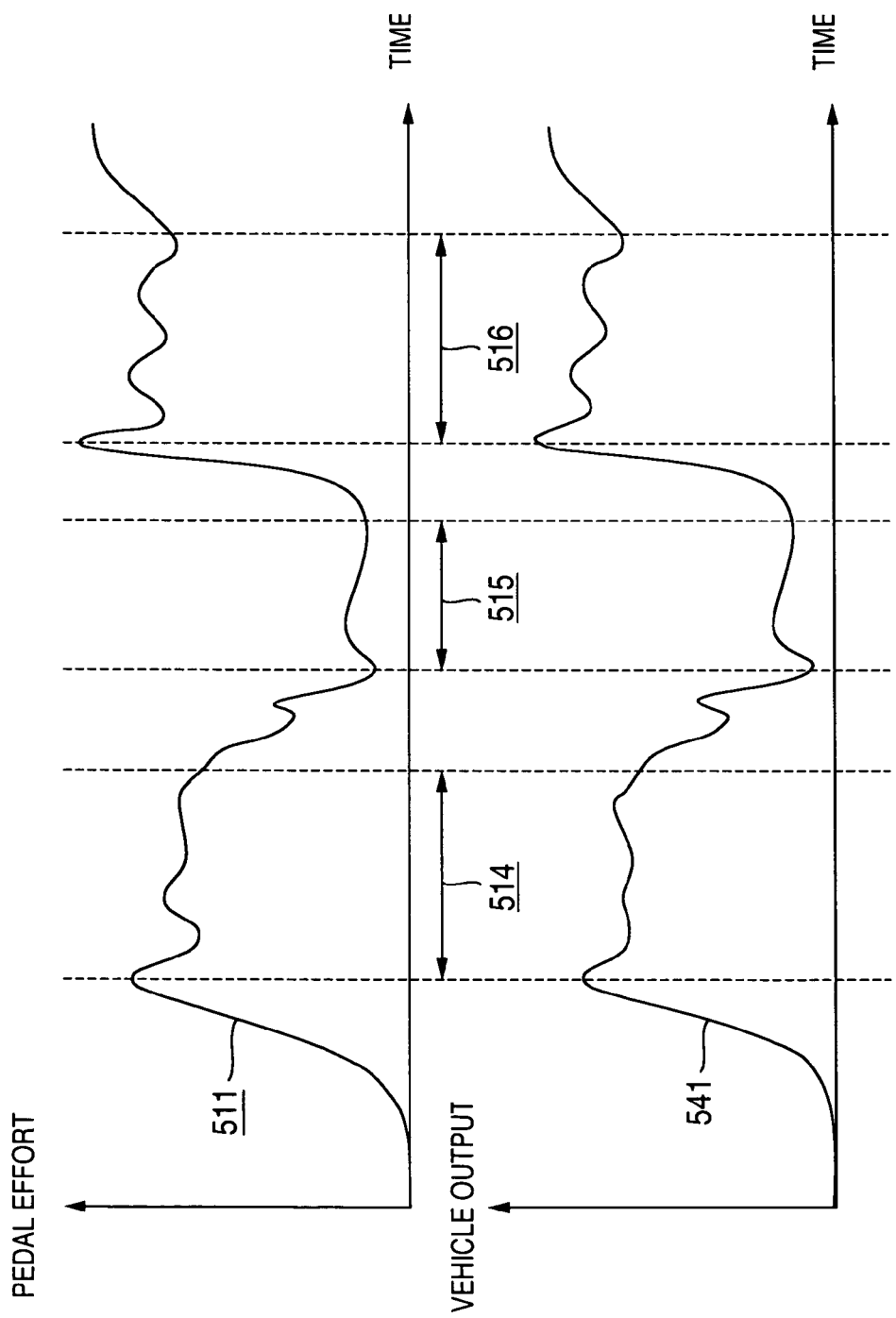

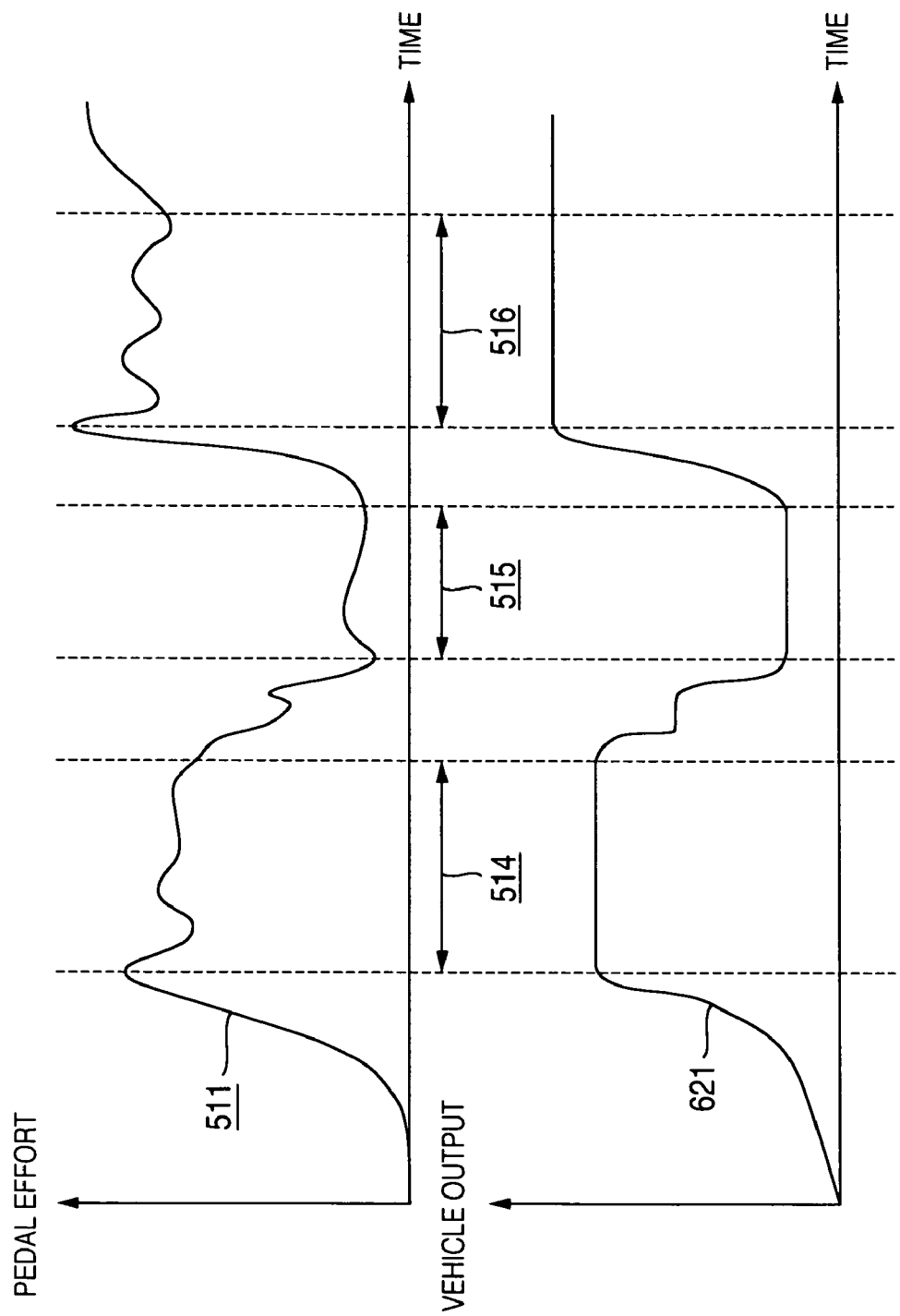

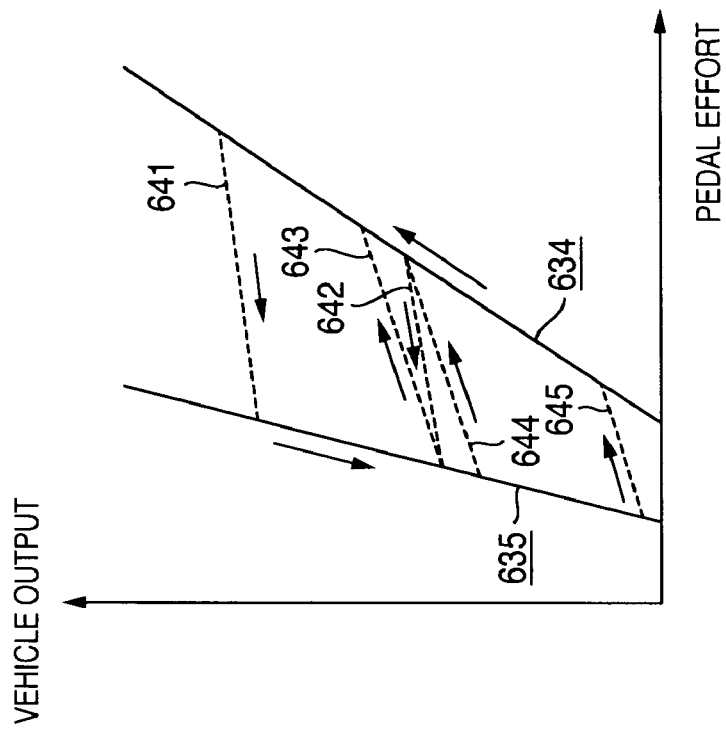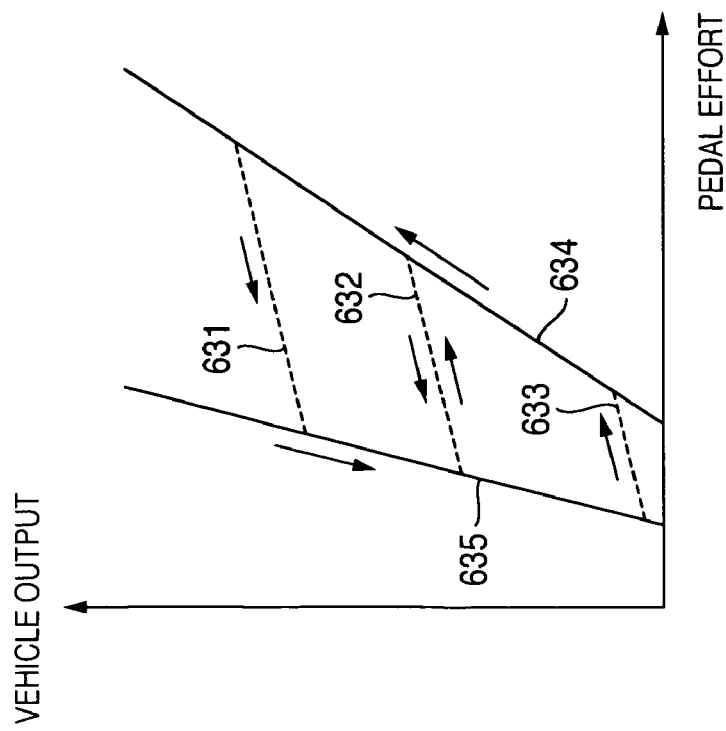

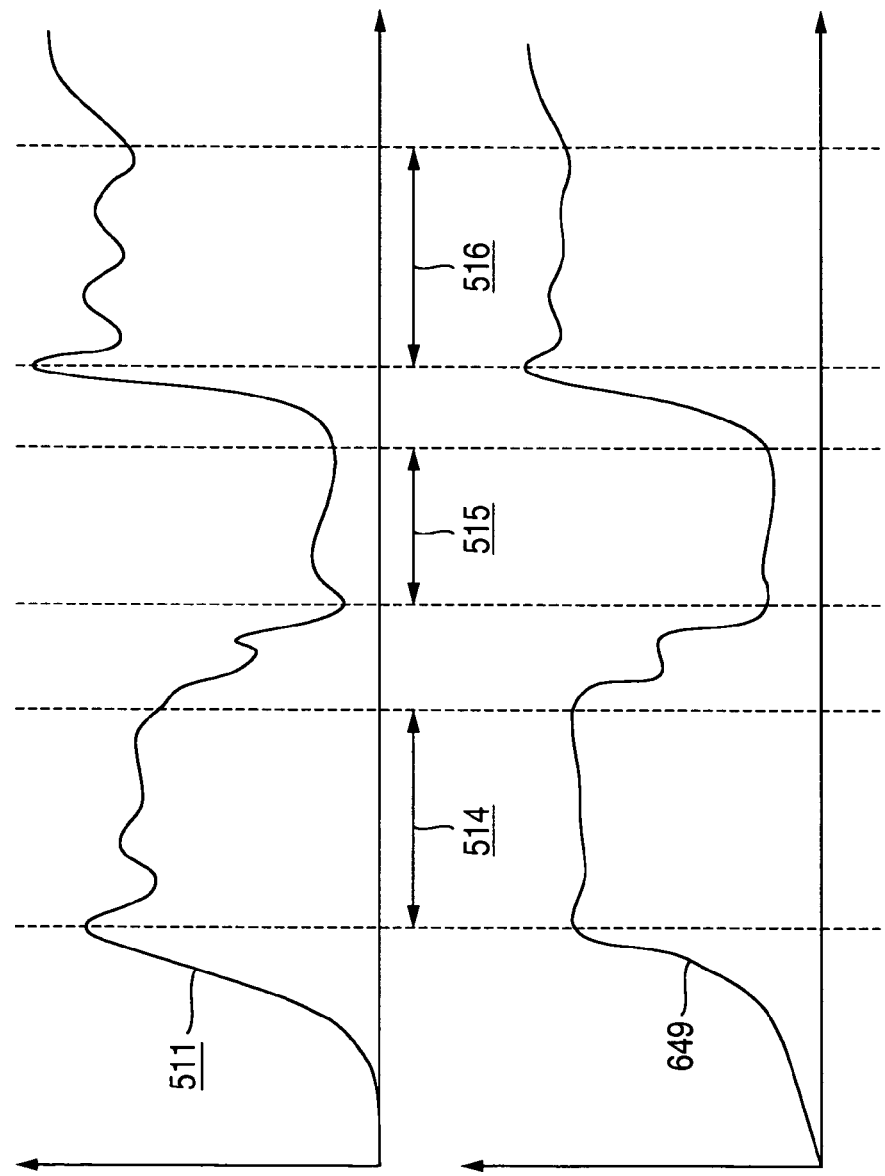

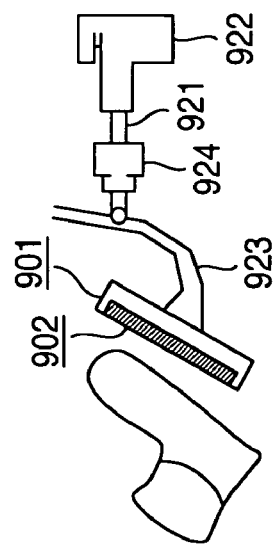
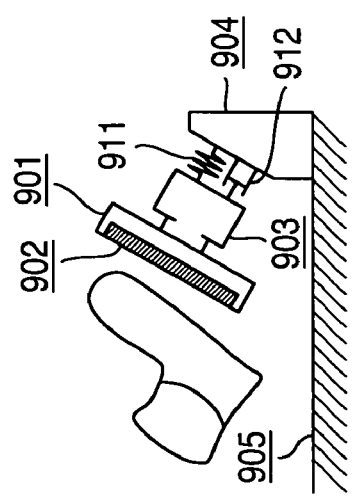
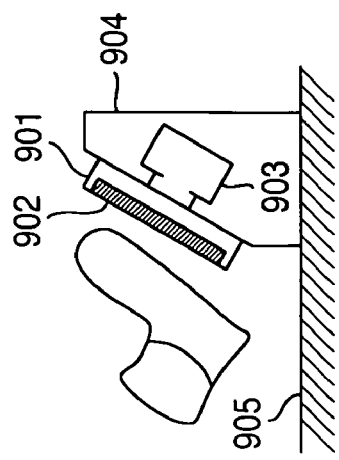

PEDAL SYSTEM AND VEHICLE SYSTEM WITH THE PEDAL SYSTEM

BACKGROUND OF THE INVENTION

1. Field of the Invention

The present invention relates to a pedal system designed to generate a vehicle output or a vehicle output command in a vehicle based on a pedal effort, and a vehicle system with such a pedal system.

2. Description of Related Art

Conventionally, the motion of a vehicle is determined by a driving force or a braking force provided by a driver, and in general, the driver drives the vehicle by depressing a pedal. Therefore, characteristics such as a pedal travel possessed by a pedal system, a pedal reaction force, a driving force for a vehicle and a braking force for the vehicle are factors determining an operational feeling, an ease of operation, a liability to fatigue and the like.

On the other hand, a conventional pedal is mechanically connected to an accelerator wire and a master cylinder and hence, the characteristics of the pedal are determined exclusively by the mechanism of the pedal. In recent years, however, the relationship of a pedal travel or a reaction force or a driving force and a braking force for a vehicle can be determined as desired in virtue of a technology called a so-called by-wire, and the examinations and investigations have been repeatedly made for how to control the relationship of the pedal travel or the reaction force or the driving force and the braking force for the vehicle. For example, there is a technique of a pedal system known from JP-A-2000-142369, which is designed so that the braking operation can be carried out easily by decreasing the stroke of a pedal travel during depression of a pedal, so that a motion of a lower leg can be made smaller.

SUMMARY OF THE INVENTION

When the stroke of the pedal travel is decreased, the resolution of the pedal travel relative to the depression is not sufficient, and it is necessary to determine a vehicle output based on a pedal effort. However, it is difficult to finely adjust the pedal effort, as compared with the manipulation of the pedal travel. For the operation for continuously maintaining a vehicle output of the same level constant or for gradually changing a very small vehicle output, when the vehicle output is delivered based on the pedal effort, the following disadvantages might be encountered in some cases: the smooth driving of a vehicle is failed; the operation is difficult; and a sense of discomfort is provided to a driver, as compared with a case where the vehicle output is delivered based on the pedal travel. There is also a problem that because the pedal effort is varied even depending on an inertial force due to an acceleration or a deceleration of the vehicle, the ease of the operation and the operational feeling are changed depending on the traveling state of the vehicle. For this reason, there is a need for a method for delivering, based on a pedal effort, a vehicle output ensuring that a driver can realize the intended movement of the vehicle smoothly without a sense of discomfort.

The operation of the vehicle free of a sense of discomfort for the depression is realized by ensuring that a hysteresis is provided in the relationship between the pedal effort and the vehicle output and that a portion of the relationship of the vehicle output or the vehicle output command relative to the pedal effort in a depressing motion or a releasing motion is represented by a relationship including a straight line (linear) or a folded line. Further, a vehicle output or a vehicle output command depending on a traveling state is delivered by changing the vehicle output or the vehicle output command relative to the pedal effort depending on the vehicle speed. In addition, an appropriate vehicle output or an appropriate vehicle output command is delivered depending on the situation by providing a maintaining motion in addition to the depressing motion and the releasing motion between which the relationship of the pedal effort and the vehicle output or the vehicle output command is different, and by changing the sensitivity of the vehicle output or the vehicle output command relative to the pedal effort in the maintaining motion depending on the pedal effort-increasing/decreasing direction, vehicle information, and the vehicle output or the vehicle output command or the pedal effort.

According to the present invention, it is possible to deliver a vehicle output determined taking account of a characteristic of variation in pedal effort which is a consideration in the realization of a pedal system adapted to deliver a vehicle output based on a pedal effort or a vehicle system provided with such a pedal system, and when the vehicle output is continued to be kept at the same level and even when the vehicle output is desired to be varied finely, it is possible to deliver a vehicle output having a good manipulatability and providing no a sense of incompatibility, based on a pedal effort.

The present invention provides a vehicle system in which a pedal effort can be detected, and which comprises a pedal system capable of delivering a vehicle output without being premised on the mechanical connection between the pedal system and a vehicle output device, wherein a vehicle output or a vehicle output command depending on a pedal effort is delivered.

Other objects, features and advantages of the invention will become apparent from the following description of the embodiments of the invention taken in conjunction with the accompanying drawings.

BRIEF DESCRIPTION OF THE DRAWINGS

FIGS. 3A to 3D are diagrammatic illustrations each showing one example of an arrangement including an operational input-calculating arithmetic unit, a vehicle output-calculating arithmetic unit(s) and a communication channel(s);

FIGS. 4A to 4E are diagrammatic illustrations each showing an application of a pedal system;

FIGS. 6A to 6C are graphs each showing one example of characteristics of pedal travel, pedal reaction force and vehicle output in a common pedal;

FIG. 8 is a graph showing one example of characteristics of pedal effort and vehicle output when a vehicle output has been delivered based on a pedal stroke;

FIG. 11 is a graph showing one example of characteristics of a pedal effort and a vehicle output when the vehicle output has been delivered based on the pedal effort;

FIGS. 12A and 12B are graphs each showing one example of the relationship between the pedal effort and the vehicle output;

FIG. 13 is a graph showing one example of characteristics of a pedal effort and a vehicle output when the vehicle output has been delivered based on the pedal effort;

FIGS. 19A to 19C are diagrammatic illustrations each showing one example of an arrangement according to an embodiment 2 of the present invention.

DETAILED DESCRIPTION OF THE INVENTION

Figure 1:
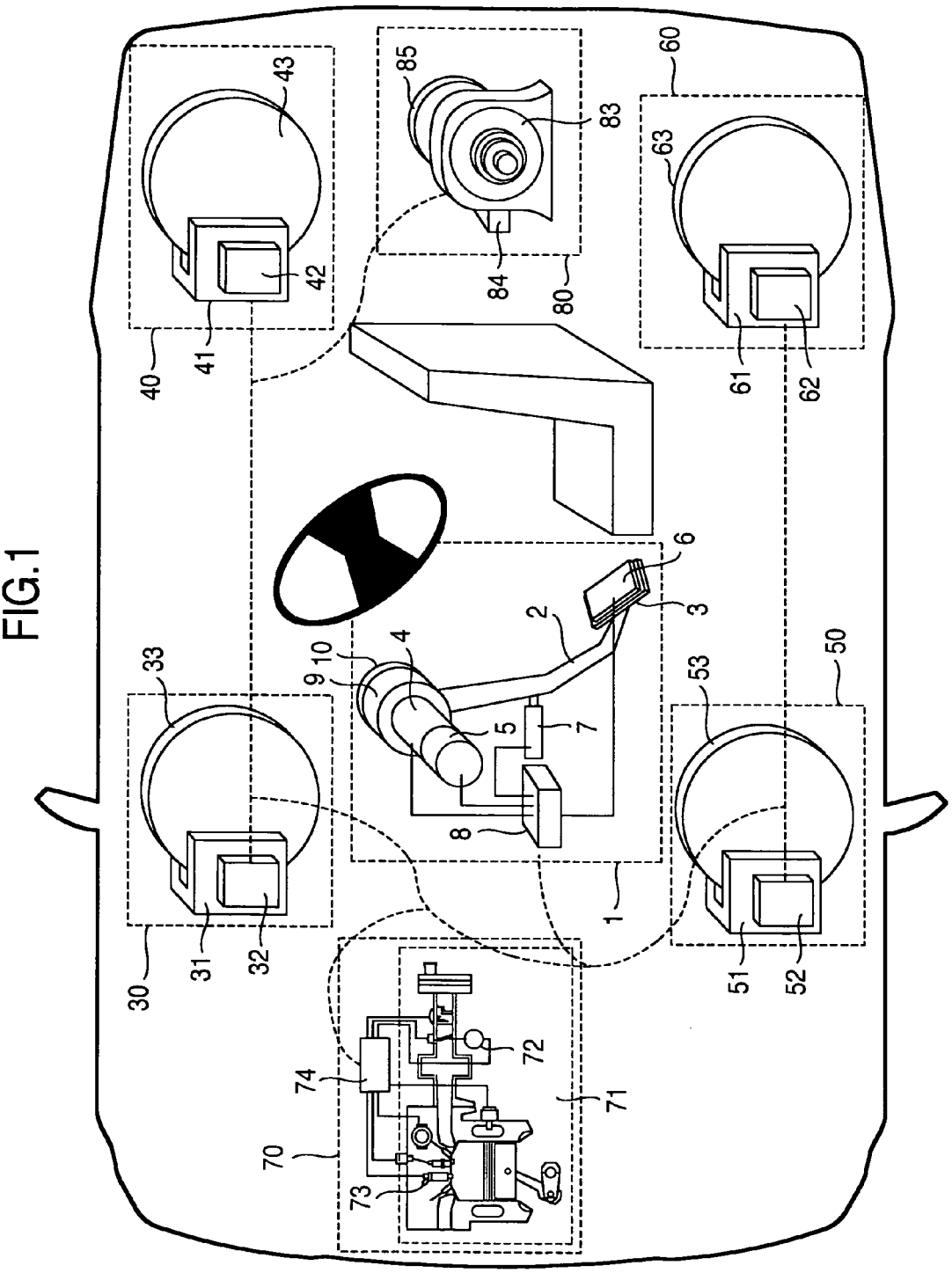
FIG. 1 is a diagrammatic illustration of a system showing one example of an arrangement according to an embodiment 1 of the present invention.
Figure 2:
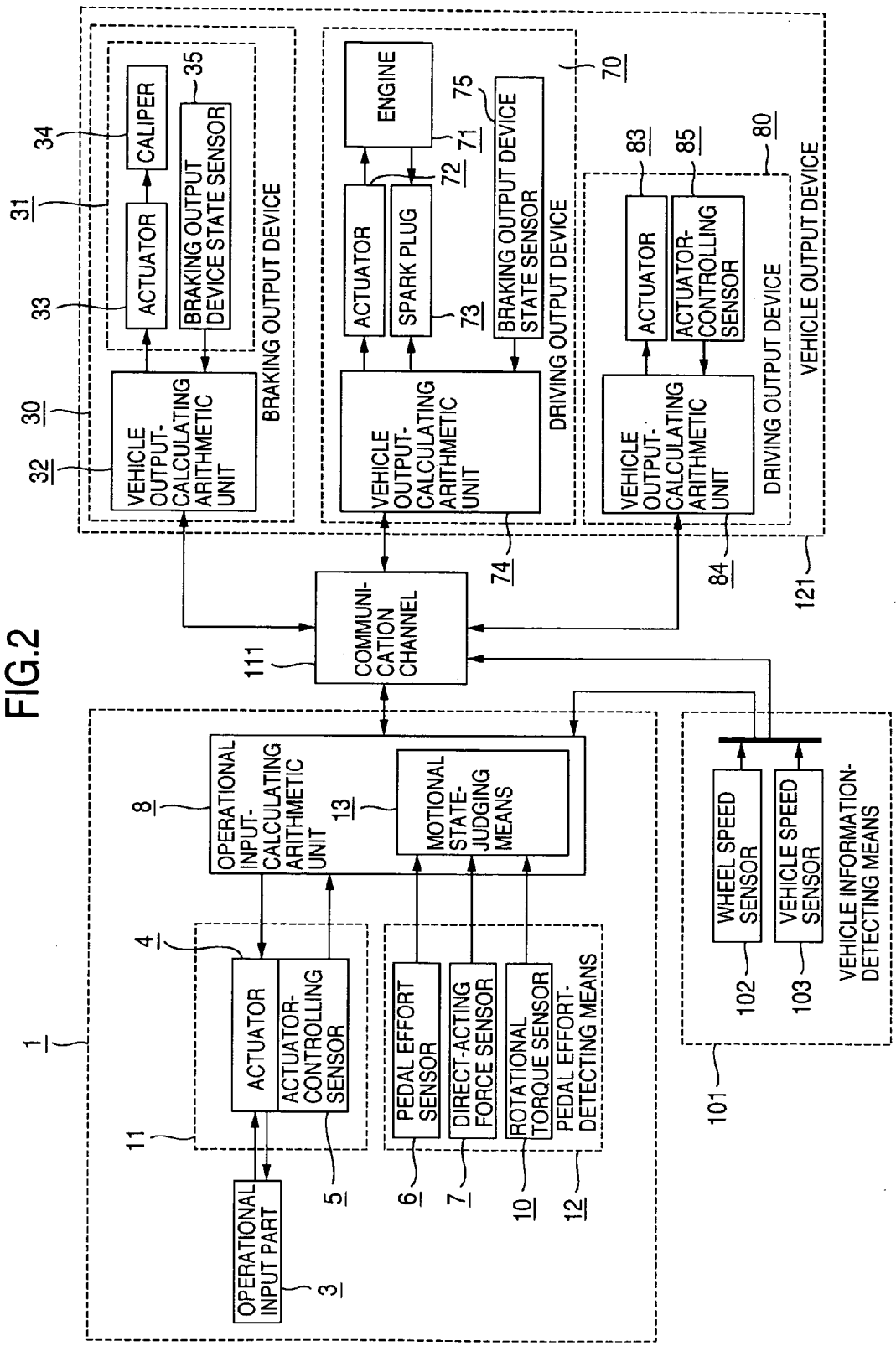
FIG. 2 is a block diagram of the system showing one example of the arrangement according to the embodiment 1 of the present invention.

FIG. 1 is a diagrammatical illustration of a system constituting the present invention. FIG. 2 is a block diagram of the system constituting the present invention.

Reference numeral 1 denotes a pedal system adapted to be operated by a driver in order to drive a vehicle. Each of reference numerals 30, 40, 50, 60, 70 and 80 denotes a vehicle output device adapted to change the movement of a vehicle. A vehicle shown in FIGS. 1 and 2 is to which a by-wire technique is applied. Especially, a combination of the vehicle output devices 30, 40, 50 and 60 and the pedal system 1 is to which a brake by-wire technique is applied, and the pedal system 1 in the brake by-wire technique is a brake pedal. When at least one of the vehicle output devices and the pedal system 1 are combined, the pedal system 1 is an accelerator pedal.

Information is transmitted between the pedal system and each of the vehicle output devices by communication through a communication channel 111. More specifically, the pedal system and each of the vehicle output devices are connected to each other by the delivery of an electric signal without being premised on a mechanical connection. An operational input to the pedal system is transmitted as an electric signal to each of the vehicle output devices, which delivers a vehicle output based on the transmitted signal information. The pedal system and each of the vehicle output devices are not premised on the mechanical connection and hence, it is possible to independently carry out the control of a pedal travel and a pedal reaction force of the pedal system and the control of the vehicle output of each vehicle output device.

The pedal system 1 includes a pedal 3 as an action point depressed by a foot. A driver applies a pedal effort to the pedal system by depressing the pedal 3. All the inputs (operational inputs) provided to the pedal system by the driver include at least the pedal effort. The pedal system 1 generates a pedal reaction force in response to the pedal effort to provide a pedal-operating feeling to the driver. The pedal-operating feeling generally provides an influence largely to a vehicle-driving feeling.

In the pedal system 1, the relationship between the pedal travel and the pedal reaction force or the pedal effort can be set as desired by an electrical control. Here, the pedal travel corresponds to an amount of pedal depressed or an operational amount. The pedal travel may be also referred to as a pedal stroke or simply a stroke. The pedal effort is a force applied to the pedal system from the driver, and generally corresponds to a force of pedal depressed by a foot or an operational force. The pedal reaction force is a force applied to the driver from the pedal system during the operation of the pedal by the driver, and corresponds to an operational reaction force. The pedal reaction force may be referred simply to as a reaction force. The pedal reaction force is a force forming a pair with the pedal effort and is generally a force in a direction opposite from the pedal effort. When the pedal is at rest in a depressed state, or when the movement of the pedal is not accelerated, the pedal effort and the pedal reaction force are balanced with each other and are substantially equivalent forces. Therefore, it can be mentioned that when the pedal reaction force is a certain value, the pedal effort is also the same value, and vice versa.

The pedal system 1 includes an actuator 4 which is capable of being electrically controlled. The actuator 4 may be, for example, an electric motor or a motor. When an electric power is supplied to the actuator 4, or when an electric current is allowed to flow to the actuator 4, a member 2 is rotated about a rotation axis 9, or a force in a rotational direction is generated. The actuator 4 includes an actuator-controlling sensor 5. An operational input-calculating arithmetic unit 8 is capable of controlling the actuator 4 based on information from the actuator-controlling sensor 5 to change the pedal travel and the pedal reaction force, as desired.

The operational input-calculating arithmetic unit 8 is adapted to transmit a vehicle output command to the vehicle output devices 30, 40, 50, 60, 70 and 80. Each of the vehicle output devices 30, 40, 50, 60, 70 and 80 delivers a vehicle output based on the vehicle output command. Namely, a vehicle output corresponding to an operational input is delivered through a communication.

As shown in FIG. 2, the pedal system 1 also includes a pedal effort-detecting means 12. The pedal effort-detecting means 12 is adapted to detect an operational force or a pedal effort and simultaneously detect an operational reaction force or a pedal reaction force. Here, the pedal effort-detecting means 12 detects the operational force and the operational reaction force as the same values, because it is a means for detecting the forces.

The operational input-calculating arithmetic unit 8 controls the actuator 4 based on the pedal effort detected by the pedal effort-detecting means 12 to change the pedal travel or the pedal reaction force. The operational input-calculating arithmetic unit 8 determines a vehicle output command based on the operational information detected by the pedal effort-detecting means 12, and then transmits the determined vehicle output command to the vehicle output devices through the communication channel 111.

The pedal effort-detecting means 12 may be either a pedal effort sensor 6 or a direct-acting force sensor 7 or a rotational torque sensor 10. The pedal effort sensor 6 is capable of detecting a pedal effort provided upon the depression of the pedal by the driver, or a pedal reaction force provided from the pedal to push back the driver's foot. The direct-acting force sensor 7 is capable of detecting a force acting on the member 2 upon the depression of the pedal 3. The sensor 10 is mounted to a rotating shaft 9 and capable of detecting a torque generated on the rotating shaft 9.

Each of the sensors 6, 7 and 10 is a sensor for detecting a force or torque and generally a sensor for detecting a strain of each of components. The detection of the strain of the component may be carried out, for example, by a method using a variation in resistance of a strain gauge or by a method of optically or magnetically measuring an amount of member displaced. At least one of the sensors 6, 7 and 10 is included in the pedal effort-detecting means 12 and can detect a physical amount corresponding to the operational force or the pedal effort.

A motional state-judging means 13 is included in the operational input-calculating arithmetic unit 8. The motional state-judging means 13 judges a motional state of the pedal based on the pedal effort. A depressing motion, a releasing motion and a retaining motion are included in the motional states. The depressing motion is a motion in which the pedal effort applied to the pedal is increased, namely, a motion at the time when the driver attempts to definitely increase the vehicle output. The releasing motion is a motion in which the pedal effort applied to the pedal is decreased, namely, a motion at the time when the driver attempts to decrease the vehicle output. The maintaining motion is a motion in which the pedal effort is maintained at a substantially constant magnitude and at the time when the driver attempts to maintain the vehicle output constant. Even in the maintaining motion, however, it is necessary for the driver to conduct the fine operation of the vehicle by increasing or decreasing the vehicle output, and the vehicle output in the maintaining motion is not necessarily constant. The motional state-judging means 13 judges a maintaining and depressing motion and a maintaining and releasing motion in the maintaining motion. In the maintaining and depressing motion, the pedal effort is increased, and in the maintaining and releasing motion, the pedal effort is decreased in the maintaining motion.

Here, a vehicle information-detecting means 101 detects vehicle information. A wheel speed, a vehicle speed and the like are included in the vehicle information. The vehicle information-detecting means 101 includes a wheel speed sensor 102 or a vehicle speed sensor 103.

Here, the wheel speed sensor 102 is a sensor for detecting a rotational speed of a wheel and may be of a type of detecting a number of rotations of the wheel using a magnetic circuit mounted to an vehicle axle, or a type of optically detecting a number of rotations of the wheel using a disc provided with slits and mounted to the vehicle axle. The vehicle speed sensor 103 may be of a type of directly detecting a vehicle speed, or a type of detecting a vehicle speed based on determined wheel speeds.

Here, the vehicle information detected by the vehicle information-detecting means 101 may be transmitted to the pedal system 1 through the communication channel 111, or transmitted directly to the pedal system 1.

The pedal system 1 may produce a vehicle output command based on the transmitted vehicle information to generate a vehicle output in the vehicle.

Each of the vehicle output devices 30, 40, 50 and 60 is an electrically controllable braking output device. A vehicle output produced by the braking output device is a deceleration or a braking force for the vehicle. The braking output device generates a braking force in the vehicle based on the transmitted vehicle output command top decelerate the vehicle. Therefore, the vehicle output command transmitted to the braking output device may be a deceleration or a braking force for the vehicle.

Here, the braking output device may be, for example, a caliper, or an electrically-powered brake capable of electrically controlling a thrust for a piston for pushing a rotor. When the braking output device is the electrically-powered brake, it is provided with an actuator adapted to generate an electrical force, and may be a mechanism which permits a force generated by the actuator to be converted into a piston thrust through a decelerator or a mechanical arrangement, or a mechanism which is capable of controlling the brake force for the vehicle by controlling the piston thrust.

The braking output device may be, for example, a caliper, or an electrically-powered hydraulic brake capable of hydraulically generating a thrust for a piston for pushing a rotor, and electrically controlling the hydraulic pressure. When the braking output device is electrically-powered hydraulic brake, it is provided with an actuator adapted to generate an electrical force, and may be a mechanism capable of changing the hydraulic pressure by the actuator, or a mechanism capable of controlling the braking force for the vehicle by controlling the hydraulic pressure.

Therefore, the vehicle output command transmitted to the braking output device may be a thrust for the electrically-powered brake, or a hydraulic pressure for the electrically-powered hydraulic brake.

The detail of the braking output device 30 will be described below. Each of the braking output devices 40, 50 and 60 is of a basically same structure as the braking output device 30.

For example, the braking output device 30 is adapted to control the braking force generated by the caliper 34 by the actuator 33. The actuator 33 is controlled by the vehicle output-calculating arithmetic unit 32. The state of the braking output device 30 can be detected by a braking output device state sensor 35. The vehicle output-calculating arithmetic unit 32 controls the actuator 33 in accordance with the state of the braking output device 30. The vehicle output-calculating arithmetic unit 32 may transmit the state of the braking output device 30 to the pedal system 1 through the communication channel 111, as required. A thrust generated by the electrically-powered brake or a hydraulic pressure generated by the electrically-powered hydraulic brake may be included in the state of the braking output device 30.

Each of the vehicle output devices 70 and 80 is an electrically controllable driving output device. A vehicle output provided by the driving output device may be a speed, an acceleration or a driving force for the vehicle. The driving output device generates a driving force in the vehicle based on the vehicle output command to accelerate the vehicle. Therefore, vehicle output command transmitted to the driving output device may be a speed, an acceleration or a driving force for the vehicle.

The driving output device for the vehicle is generally in the form of an engine such as 70 in many cases. In a hybrid car or an electric automobile or an electrically-powered four-wheel drive vehicle, however, the driving output device may be in the form of an electric motor such as 80 or in the formed of a combination of an engine and an electric motor.

The detail of the driving output device 70 will be described below. The driving output device 70 is an engine and for example, a mechanism for driving the vehicle using gasoline or a gas oil as a fuel. The driving output device 70 is adapted to control an actuator 72 or a spark plug 73 in accordance with the transmitted vehicle output command and the state of the driving output device to produce a vehicle output in the engine 71. The state of the driving output device is detected by a driving output device state sensor 75. The actuator 72 is controlled by a vehicle output-calculating arithmetic unit 74. The vehicle output-calculating arithmetic unit 74 may transmit the state of the driving output device to the pedal system 1 through the communication channel 111, as required. A driving force or a number of rotations of the engine 71 may be included in the state of the driving output device.

The detail of the driving output device 80 will be described below. The driving output device 80 is, for example, an electric motor, and is adapted to produce a vehicle output by supplying an electric power or by allowing an electric current to flow. For example, the driving output device 80 includes an actuator 83 and a sensor 85 for controlling the actuator, and is controlled by a vehicle output-calculating arithmetic unit 84. The vehicle output-calculating arithmetic unit 84 may transmit the state of the driving output device 90 to the pedal system 1 through the communication channel 111, as required.

In fact, the vehicle output command and the vehicle output do not necessarily coincide completely with each other in some cases. However, how faithful the vehicle output device delivers a vehicle output in accordance with the vehicle output command is not an essential factor in the present invention. Therefore, the following description is on the assumption that the vehicle output is equal to the vehicle output command. Namely, in the present invention, the vehicle output may be changed into an expression as the vehicle output command, and the delivering of the vehicle output by the pedal effort is synonymous with the delivering of the vehicle output command by the pedal effort. Further, even in the description with reference to Drawings, an axis of the vehicle output is essentially equivalent to an axis of the vehicle output command, and the vehicle output command may be employed in place of the vehicle output.

The communication channel 111 is an information channel which connects the pedal system and the vehicle output devices to transmit information in the form of electric signals. The communication channel 111 is physically formed by electric wires. The pedal system and the vehicle output devices are placed in spatially spaced locations in many cases, and information is delivered between the pedal system and the vehicle output devices through the communication channel 111, generally using an electric signal in a time-division multiplex operation system. The type of the electric signal used in the communication channel 111 may be a serial communication, or a multiplex communication such as CAN, FlaxRay, LAN and the like.

FIGS. 3A to 3D show the arrangement of the communication channel 111 between the operational input-calculating arithmetic unit 8 and the vehicle output-calculating arithmetic unit. In FIG. 3A, a single communication channel is mounted, and the vehicle output devices 151 to 154 are controlled by the single vehicle output-calculating arithmetic unit 150. For example, the arrangement may be such that there is only a single system adapted to control the hydraulic pressure such as an ABS system and a non-skid system to transmit the hydraulic pressure to each of calipers, and the electrical communication with the operational input-calculating arithmetic unit 8 is carried out through the single communication channel 111.

In FIG. 3B, two communication channels 111 are mounted, and vehicle output devices 156, 157, 159 and 160 are controlled by vehicle output-calculating arithmetic units 155 and 158. For example, when separate hydraulic systems are mounted on the side of front wheels and on the side of rear wheels in a vehicle, two systems for controlling the hydraulic pressure are mounted, and two channels for the electrical communication with the pedal system are also required. By the provision of two lines, it is possible to provide an enhancement in reliability and to provide an enhancement in motional performance of the vehicle by performing the vehicle output on each line.

In FIG. 3C, a single communication channel 111 is mounted, but vehicle output devices 165 to 168 are controlled by separate vehicle output-calculating arithmetic units 161 to 164, respectively. For example, when electrically-powered brakes are mounted for all of four wheels of a vehicle, it is considered that a system for controlling the vehicle output is mounted for each wheel to permit the communication with the pedal system. It is possible to provide an enhancement in motional performance of the vehicle at a higher level by controlling the vehicle outputs independently for all of the four wheels of the vehicle.

In FIG. 3D, two communication channels 111 are mounted, and vehicle output devices 173 to 176 are controlled by separate vehicle output-calculating arithmetic units 169 to 172, respectively. For example, when electrically-powered brakes are mounted for all of four wheels of a vehicle, if a system for controlling the vehicle output is mounted for each wheel, then the arrangement may be such that the communication of the front right wheel and the rear left wheel with the pedal system may be conducted through the same communication channel, and the communication of the front left wheel and the rear right wheel with the pedal system may be conducted through the same communication channel. In addition, when electrically-powered brakes are mounted for all of four wheels of a vehicle, if a system for controlling the vehicle output is mounted for each wheel, then the arrangement may be such that the communication of the two front wheels with the pedal system may be conducted through the same communication channel, and the communication of the two rear wheels with the pedal system may be conducted through the same communication channel. The provision of the two communication channels ensures that even when an obstruction or a trouble has been generated in one of the communication channels, the vehicle output device belonging to the other communication channel is operated and hence, it is possible to provide an enhancement in reliability for the entire vehicle.

FIGS. 4A to 4E are diagrammatic illustrations showing applications of pedal systems. FIG. 4A shows a pedal system in which an operational input portion 402 is located below a rotating shaft 401. FIG. 4B shows a pedal system in which an operational input portion 403 is located above a rotating shaft 404. FIG. 4C shows a pedal system which is provided with no rotating shaft, so that the pedal system is operated directly in response to an action inputted to an operational input portion 405. FIG. 4D shows a pedal system in which a rotating shaft 406 and an actuator 407 are mounted separately from each other. In this case, a rotational output from the actuator 407 is converted into an output in a direct-acting direction by a rotation-direct action converting mechanism 408 and applied to a member 409, thereby moving a pedal end 410 or generating an operational reaction force. Here, for example, a worm gear or a ball screw may be employed as the rotation-direct action converting mechanism 408.

FIG. 4E shows a pedal system in which an actuator 411 is not a rotary motor and is adapted to be displaced in a direct-acting direction or to generate a force. The pedal system is moved or generates an operational reaction force by the application of an output from the actuator to a member 412. The actuator 411 may be, for example, a solenoid.

Figure 5B:
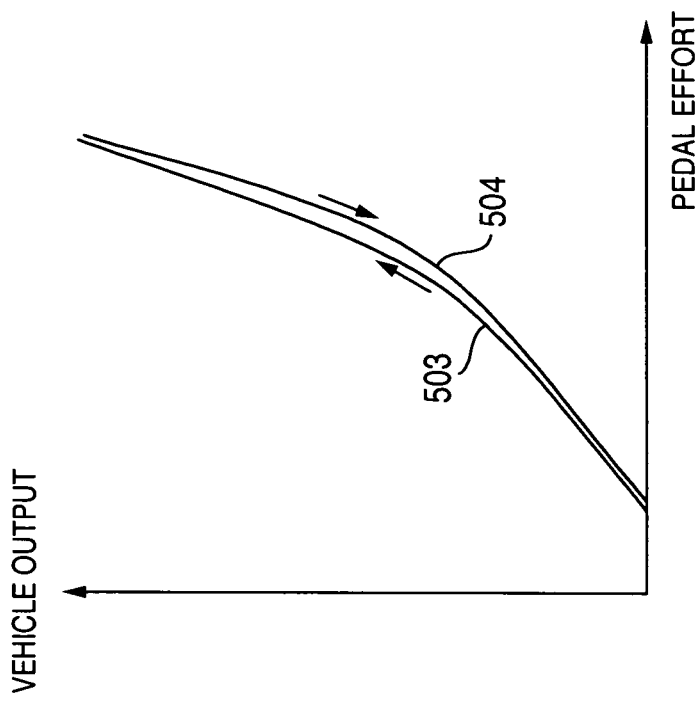
FIGS. 5A and 5B are graphs each showing one example of a common pedal characteristic.
Figure 5A:
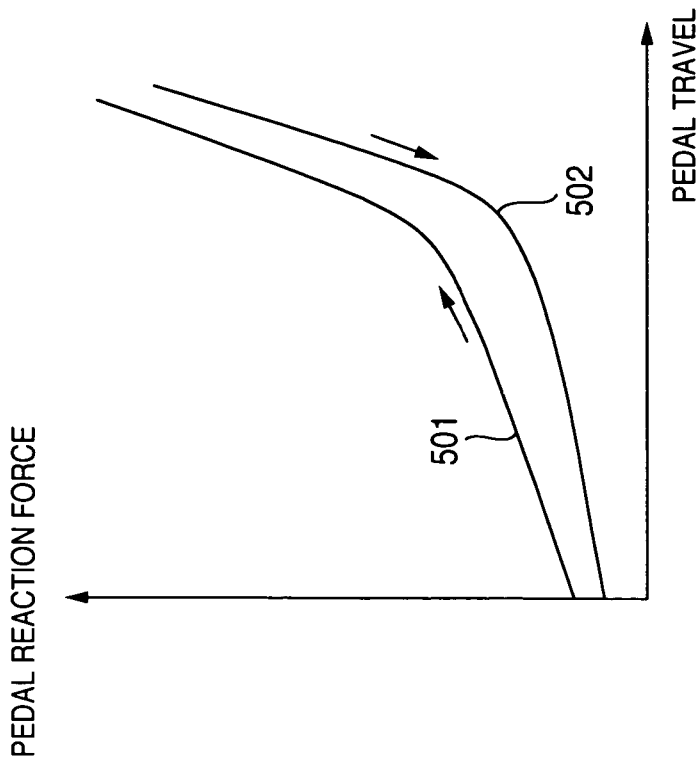

FIGS. 5A and 5B show the relationships between the pedal travel and the pedal reaction force and between the pedal effort and the vehicle output for a common pedal system. Here, the common pedal system is a pedal system which is premised on that a vehicle output device is connected the pedal system by a hydraulic mechanism or by a mechanical mechanism such as a wire, so that an operation input is transmitted by the mechanical mechanism to deliver a vehicle output. Alternatively, the common pedal system may be a pedal system which is not premised on the mechanical connection and which is constructed in imitation of a pedal system premised on the mechanical connection.

In the common pedal system, for example, the larger the pedal travel as a result of the depression of a pedal, the larger the pedal reaction force, as shown in FIG. 5A. The relationship of the pedal reaction force with the pedal travel during depression of the pedal is, for example, as shown by a curve 501, while the relationship of the pedal reaction force with the pedal travel during releasing of the pedal is, for example, as shown by a curve 502. Namely, the pedal reaction force has the curve 501 of the depressing motion and the curve 502 of the releasing motion, and has a hysteresis characteristic in which the pedal reaction force is different depending on the direction.

In addition, the vehicle output in the common pedal system is also larger depending on the pedal effort, for example, as shown in FIG. 5B. The relationship of the vehicle output with the pedal effort during depression of the pedal is, for example, as shown by a curve 503, while the relationship of the vehicle output with the pedal effort during releasing of the pedal is, for example, as shown by a curve 504.

Namely, the vehicle output also has a hysteresis characteristic, because it is realized by the curves 503 and 504. However, the hysteresis characteristic of the vehicle output with respect to the pedal effort is small as compared with the hysteresis characteristic of the vehicle reaction force with respect to the pedal travel, and depending on the type of the pedal system, the curves 503 and the 504 may be substantially identical to each other in some cases. In addition, depending on the type of the pedal system, the same curves 503 and 504 of the vehicle output can be employed, so that the vehicle output has no hysteresis with respect to the pedal effort.

Examples of a pedal effort, a pedal travel and vehicle output in the operation of a pedal in a pedal system having a characteristic as shown in FIGS. 5A and 5B are shown in FIGS. 6A to 6C.

Figure 16B:
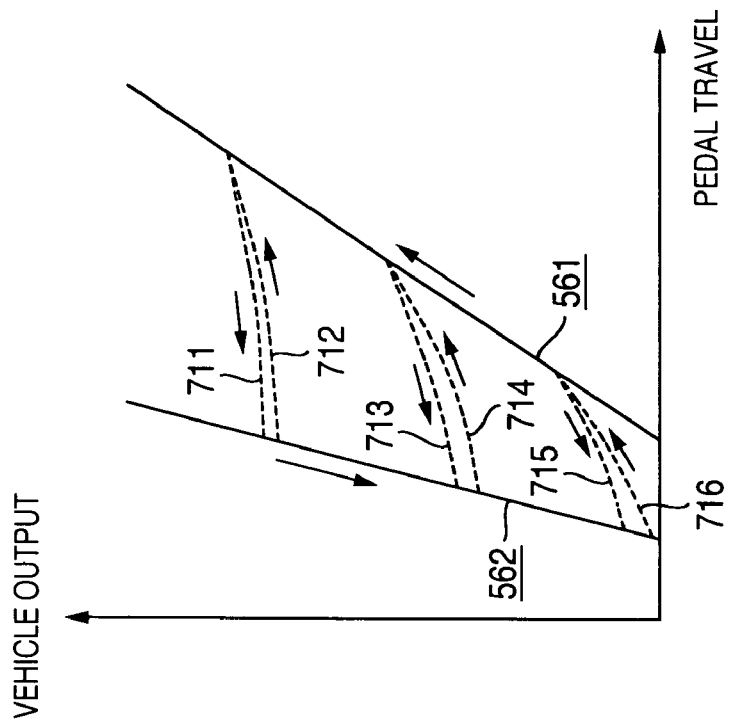
FIGS. 16A and 16B are graphs each showing one example of the relationship between the pedal effort and the vehicle output.
Figure 16A:
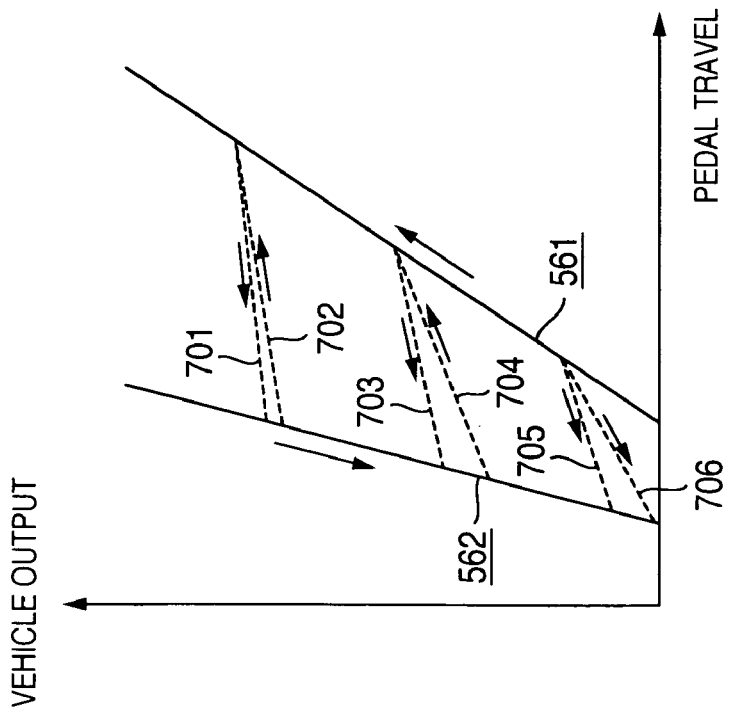

A curve 511 in FIG. 16A represents the pedal effort; a curve 51 in FIG. 6B represents the pedal travel; and a curve in FIG. 6C represents the vehicle output.

In general, the pedal effort is early to rise and fall, as compared with the pedal travel, and a constant pedal effort may be continued very rarely. Therefore, an overshooting or an undershooting may occur in more cases, when the vehicle output is changed by the pedal effort rather than when the vehicle output is changed by the pedal travel.

For example, in a region 514, a pedal travel 512 is advanced to a pedal travel 521 by depression of the pedal and maintained therein at a substantially constant pedal travel. Therefore, a vehicle output 513 is also almost constant at a vehicle output 522. However, a pedal effort 511 is overshot in a region 514 and thereafter, is not maintained at a constant value.

The reason why the pedal travel or the vehicle output is maintained constant even if the pedal effort is frequently changed is attributable to the hysteresis of the pedal reaction force or the vehicle output. It is effective from viewpoints of enhancing the driving operability and comfort and alleviating the fatigue of a lower leg to ensure that the constant vehicle output can be maintained as desired in the driving operation of the vehicle, and the hysteresis characteristic possessed by the pedal system is an important factor in the pedal system.

Even in a region 515 where the maintaining motion is being conducted in a state in which the depressed pedal has been returned to a certain degree, the pedal effort is undershot and always varied vertically, and on the other hand, variations in pedal travel and vehicle output are suppressed to a smaller level due to the hysteresis.

In a region 516, the vehicle output is varied to a certain degree by intentionally varying the pedal effort largely. This indicates that the driver is finely adjusting the vehicle output in the maintaining motion. When the vehicle output is changed in the maintaining motion as in the region 516, the driver attempts to vary the pedal effort roughly, but because each of the pedal travel and the vehicle output has the hysteresis, the vehicle output can be adjusted skillfully.

For the pedal system 1, a pedal system using a characteristic as shown in FIGS. 5A and 5B can be electrically realized so that a driving operation thereof similar to that of the conventional pedal system can be achieved. However, in a pedal system which is not premised on the mechanical connection to the vehicle output device, a pedal travel and a pedal reaction force can be established independently from the vehicle output. For example, it is possible to construct a pedal system in which the pedal travel is little varied irrespective of the pedal reaction force, as in FIG. 7A. In the pedal system in which the pedal travel is little varied, a small movable range suffices, leading to a substantial increase in degree of design freedom of a layout below a driver's seat. In addition, a driver can drive the vehicle without stretching a foot because of no stroke and hence, can conduct the driving of the vehicle, while constantly keeping an optimal driving position. Further, it is unnecessary to move the foot quickly for the rapid depression, because of no stroke, and for example, it is easy to carry out the hard braking.

Figure 7B:
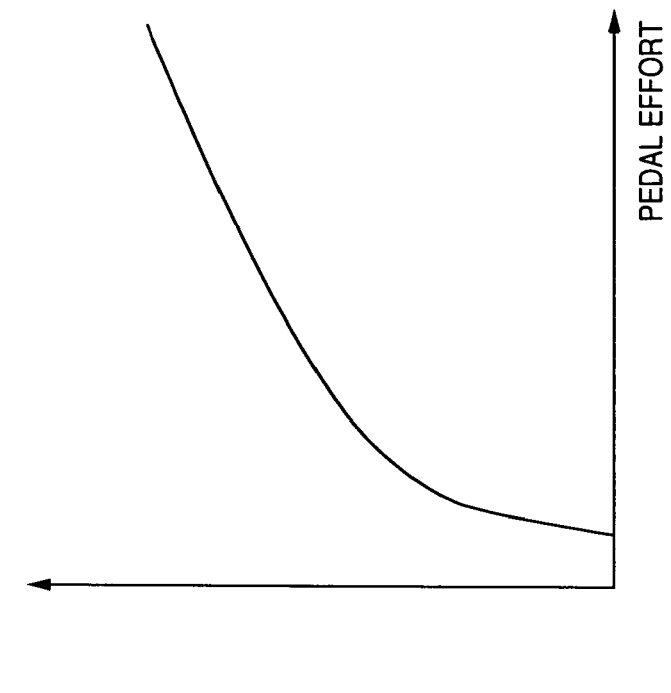
FIGS. 7A and 7B are graphs each showing one example of characteristics of a pedal system which is not stroked at all or little stroked.
Figure 7A:
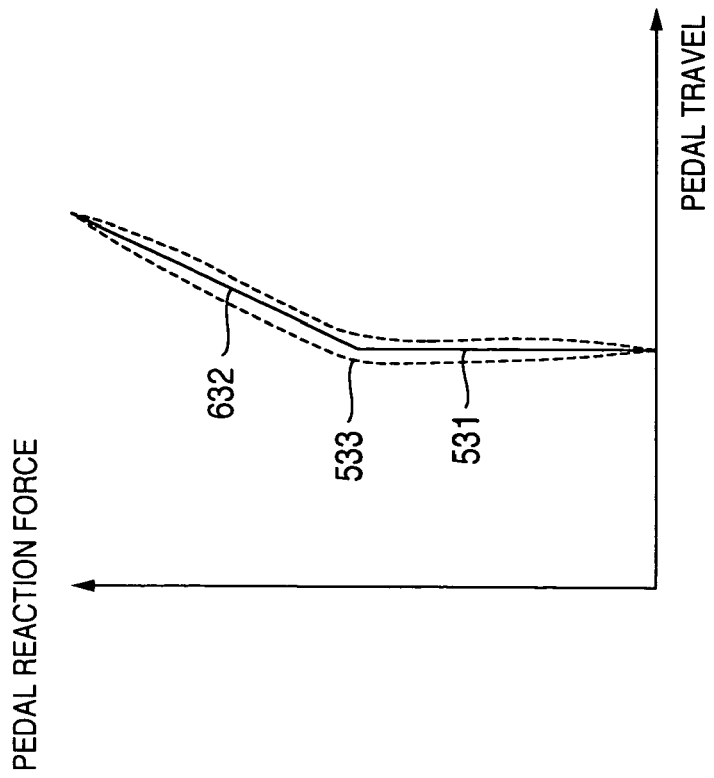

A pedal system in which a pedal is little stroked is realized, for example, by fixing the pedal travel by an actuator, and ideally, the pedal reaction force with respect to the pedal travel is controlled to be parallel to a pedal reaction force axis, as is a reaction force 531 shown in FIG. 7A. However, the pedal system may be of an arrangement in which when a pedal effort larger than an output from the actuator is provided, the pedal is slightly stroked in accordance with the pedal effort, for example, as in a reaction force 532. In addition, it may be permitted that the pedal travel is slightly varied actually, as is a reaction force 533, due to the responsiveness and controllability of the actuator and the strain of the component.

In FIG. 7A, the pedal travel is little varied with respect to the pedal effort and hence, the vehicle output is delivered based on the pedal effort (see FIG. 7B).

FIG. 8 shows one example of the vehicle output and the pedal effort when the vehicle output relative to the pedal effort has been delivered based on FIG. 7B.

A hysteresis is not included in FIG. 7B and hence, a vehicle output 541 in FIG. 8 is always varied in accordance with a pedal effort 511. Therefore, even in regions 514 and 515 where the vehicle output is desired to be intrinsically maintained constant, the vehicle output is not maintained constant, and even in a region 516 where the fine adjustment of the vehicle output is desired to be carried out, there is a large variation in vehicle output generated.

Therefore, the vehicle output relative to the pedal effort is provided with a hysteresis characteristic as shown in FIG. 9. Here, a hysteresis characteristic of the vehicle output which is not based on the pedal travel is realized by ensuring that the sensitivity of the vehicle output relative to the pedal effort in the depressing motion and the sensitivity of the vehicle output relative to the pedal effort in the releasing motion are different from each other. Here, the sensitivity of the vehicle output relative to the pedal effort indicates a rate represented by how much the vehicle output is delivered upon the depression of the pedal with a certain pedal effort, and at the same time, a rate represented by how much the vehicle output is varied when the pedal effort is varied. Namely, the sensitivity of the vehicle output relative to the pedal effort may be changed into an expression as a gradient of the vehicle output relative to the pedal effort or as a value resulting from the differentiation of the vehicle output by the pedal effort.

Figure 9B:
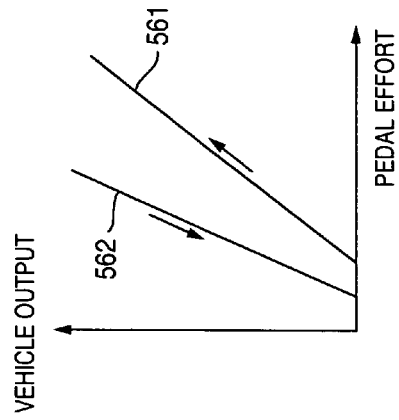
FIGS. 9A to 9D are graphs each showing one example of the relationship between the pedal effort and the vehicle output.
Figure 9D:
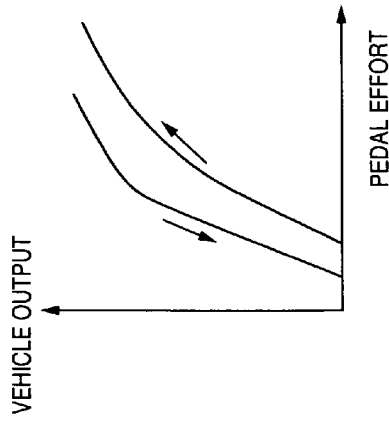
Figure 9A:
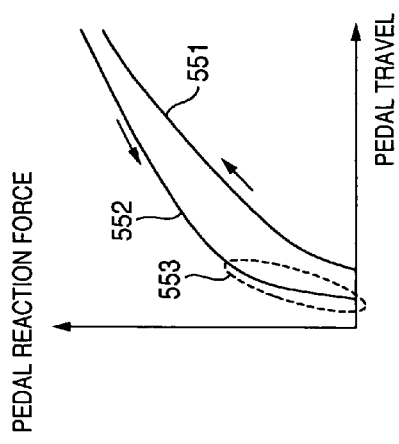

Here, for example, if the relationship between the pedal effort and the vehicle output is selected from the relationships between twos of the pedal travel, the pedal reaction force (pedal effort) and the vehicle output and the pedal effort in FIGS. 5A and 5B, the hysteresis characteristic of the vehicle output relative to the pedal effort is as shown in FIG. 9A. A vehicle output in a common depressing motion is described as a curve larger on a pedal effort axis and smaller on a vehicle output axis. Namely, a vehicle output 551 is one generated in a depressing motion at the time when the pedal effort applied to the pedal is intended to be increased. On the other hand, a vehicle output 552 is one generated in a releasing motion at the time when the pedal effort applied to the pedal is intended to be decreased. By changing the uses of the vehicle output 551 and the vehicle output 552 depending on the depressing motion or the releasing motion, the vehicle output can be provided with a hysteresis characteristic, even if the pedal travel is not varied.

However, FIG. 9A shows the characteristic when the vehicle is driven on the basis of the pedal travel and hence, when the vehicle is driven on the basis of the pedal effort, the relationship shown in FIG. 9A is not desirable in some cases. For example, in a region 553 where the pedal effort is smaller in the vehicle output 553 shown in FIG. 9A in the releasing motion, the gradient of the vehicle output relative to the pedal effort is extremely steep. This means that an operation with a very small pedal effort is required in order to adjust the vehicle output in this region, because the sensitivity of the vehicle output relative to the pedal effort is too high. The common pedal effort is varied largely and hence, it is difficult in some cases to adjust the vehicle output, as desired, by a pedal having a sensitivity (gradient) as in the region 553. For this reason, when the vehicle output is delivered as shown in FIG. 9A, there is a possibility that the vehicle output is rapidly decreased in the releasing motion against the driver's will.

Therefore, a method for delivering the vehicle output relative to the pedal effort without being based on FIGS. 5A and 5B may be used. For example, such method includes a method by which a vehicle output 561 in the depressing motion and a vehicle output 562 in the releasing motion are realized as shown by straight lines, so that each of them is not of a steep gradient as in the region 553. Here, the sensitivity of the vehicle output relative to the pedal effort is in a range on the order of 0.002 G/N to 0.01 G/N, but it is necessary to ensure that the vehicle output 561 in the depressing motion and the vehicle output 562 in the releasing motion do not intersect each other.

Figure 9C:
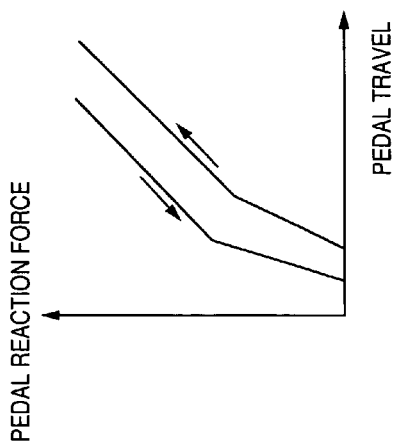

It is also possible to employ a characteristic shown by a folded line, which is provided by changing the sensitivity of the vehicle output relative to the pedal effort in the middle, for example, as shown in FIG. 9C, so that when the pedal effort is large, the vehicle output is not too large. Further, if the characteristic is changed discontinuously in the straight line and the folded line, it is a factor for providing a sense incompatibility to the driver, and hence, the vehicle output may be delivered using a combination of a straight line and a folded line, for example, using a characteristic as shown in FIG. 9D.

As for the relationship between the pedal effort and the vehicle output, those different between in the depressing motion and the releasing motion are used, but even as for the relationship between the pedal effort and the vehicle output in the period of transition from the depressing motion to the releasing motion or in the period of transition from the releasing motion to the depressing motion, those different between in the depressing motion and the releasing motion are also used.

The period of transition from the depressing motion to the releasing motion or the period of transition from the releasing motion to the depressing motion can be referred to as a maintaining motion.

The relationship between the pedal effort and the vehicle output in the maintaining motion will be described below. For clarity, the vehicle output in each of the depressing motion and the releasing motion will be represented in the following Figures by a straight line as shown in FIG. 9B. However, the relationship between the pedal effort and the depressing output in the maintaining motion which will be described hereinafter can be applied to all of FIGS. 9A and 9D.

Figure 10A:
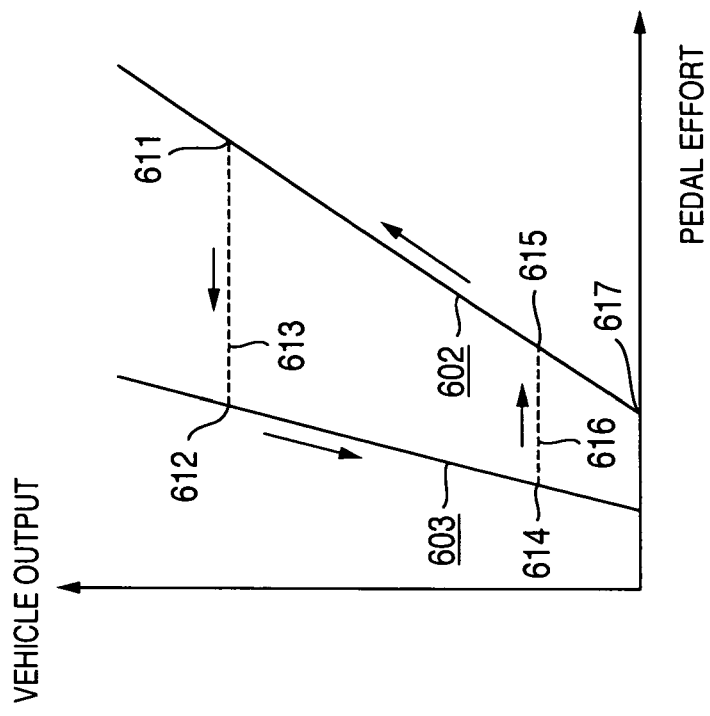
FIGS. 10A and 10B are graphs each showing one example of the relationship between the pedal effort and the vehicle output.

In FIG. 10A, when the relationship between the pedal effort and the vehicle output exists in a region 601 between a vehicle output profile 602 in the depressing motion and a vehicle output profile 603 in the releasing motion, the region 601 is defined as a maintaining motion.

Here, whether the pedal is in the depressing motion or in the maintaining motion is judged by the motional state-judging means 13.

Figure 10B:
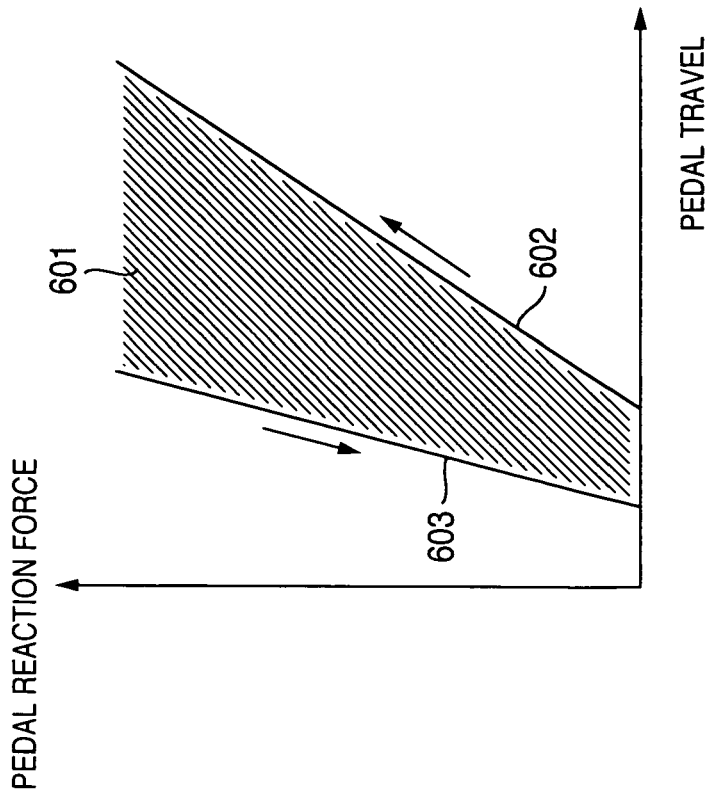

Here, in the relationship between the pedal effort and the vehicle output in the maintaining motion, the vehicle output may be maintained constant relative to a variation in pedal effort, for example, as shown in FIG. 10B.

In FIG. 10B, for example, when the vehicle output is attempted to be increased from a pedal effort value of zero (0), the vehicle output remains zero (0) up to a pedal effort value 617, even if the pedal effort is increased. When the pedal effort value 617 is exceeded, the vehicle output is delivered in accordance with a vehicle output profile 602. Here, provided that the pedal effort has been decreased after increasing of the pedal effort up to a pedal effort value 611, the vehicle output is delivered based on a vehicle output profile 613 in the maintaining motion rather than the vehicle output profile 602 as theretofore in the depressing motion. The vehicle output profile 613 is parallel to the pedal effort axis, and hence, the vehicle output is kept constant as at the pedal effort value 611, until the pedal effort will be lower than a value 612. Here, when the pedal effort becomes lower than the value 612, the vehicle output is delivered based on the vehicle output profile 603. Further, when the pedal effort has been increased again after decreasing of the pedal effort down to a pedal effort value 614, the vehicle output is delivered in accordance with a vehicle output profile 616 in the maintaining motion. The vehicle output profile 616 is parallel to the pedal effort axis, and hence, the vehicle output is kept constant as at the pedal effort value 614, until the pedal effort will be higher than a value 615. Here, when the pedal effort becomes higher than the value 615, the vehicle output is delivered again based on the vehicle output profile 602.

FIG. 11 shows one example of the vehicle output relative and the pedal effort when the vehicle output has been delivered as shown in FIG. 10B. A hysteresis characteristic is included in the vehicle output relative to the pedal effort as a result of use of FIG. 10B. Therefore, a vehicle output value 621 is kept constant in regions 514, 515 and 516. Namely, the use of FIG. 10B ensures that the vehicle output can be kept constant in the maintaining motion as in the regions 514 and 515, even when the vehicle output is delivered on the basis of the pedal effort, whereby a pedal system having an operability and a comfort can be realized.

However, when the vehicle output in the maintaining motion has been kept constant as shown in FIG. 10B, even a remarkably large variation in pedal effort is absorbed into the hysteresis. Therefore, in a region where the fine adjustment of the vehicle output has been carried out, for example, as in the region 516, the vehicle output is not varied.

In FIG. 10B, the gradient of the vehicle output relative to the pedal effort is steeply changed as in the pedal effort 612 in the switchover between the maintaining motion and the releasing motion, or as in the pedal effort 615 in the switchover between the maintaining motion and the depressing motion. What is inputted to the pedal system by the driver is the pedal effort and hence, when the gradient of the vehicle output is steeply changed, it causes the operation to be made difficult, and causes a sense of compatibility to be provided to the driver.

Therefore, a slight gradient may be provided to the vehicle output even during the maintaining motion, for example, as shown in FIGS. 12A and 12B. The provision of the gradient makes it possible to provide a sensitivity of the vehicle output relative to a variation in pedal effort during the maintaining motion and to moderate the steep change in sensitivity at the switchover between the maintaining motion and the depressing motion or the releasing motion. The gradient of the vehicle output during the maintaining motion must not be smaller than that of a vehicle output 634 in the depressing motion at a point of intersection with the vehicle output 634. Further, the gradient of the vehicle out during the maintaining motion must not be smaller than that of a vehicle output 635 in the releasing motion at a point of intersection with the vehicle output 635.

Here, the gradient of the vehicle output relative to the pedal effort during the maintaining motion may be constant irrespective of directions of increase and decrease of the pedal effort, as in 631 to 633.

The pedal effort operation is easier in a pedal-depressing direction (in a pedal effort-increasing direction) and more difficult in a pedal-releasing direction (in a pedal effort-decreasing direction, because it is carried out by the driver's foot. Therefore, it is desirable that the sensitivity of the vehicle output in the maintaining motion in the pedal effort-increasing direction in which the pedal effort operation is relatively easy is different from the sensitivity of the vehicle output in the maintaining motion in the pedal effort-decreasing direction in which the pedal effort operation is relatively difficult. For this purpose, there is also a method in which the gradient of the vehicle output relative to the pedal effort in the same maintaining motion is varied between in the motion of increasing the pedal effort (the maintaining and depressing motion and in the motion of decreasing the pedal effort (the maintaining and releasing motion), as shown in FIG. 12B. Here, vehicle outputs 643, 644 and 645 are provided in the maintaining and depressing motion, and vehicle outputs 641 and 642 are provided in the maintaining and releasing motion. In FIG. 12B, the sensitivity in the maintaining and depressing motion is larger than that in the maintaining and releasing motion, and the vehicle outputs 643, 644 and 645 are larger in gradient than the vehicle outputs 641 and 642 in order to ensure that the sensitivity in the maintaining and depressing motion is larger than that in the maintaining and releasing motion.

One example of the pedal effort and the vehicle output provided using FIGS. 12A and 12B is shown in FIG. 13. In FIG. 13, a vehicle output 649 is kept at a substantially equal value in regions 514 and 515, and the constant vehicle output is delivered in the maintaining motion. In a region 516, the vehicle output is varied in accordance with the pedal effort even in the maintaining motion, which indicates that the adjustment of the vehicle output can be achieved even during the maintaining motion.

Namely, by using the relationship between the pedal effort and the vehicle output having a hysteresis characteristic as shown in FIGS. 9A and 9B and FIGS. 12A and 12B and having a sensitivity even during the maintaining motion as shown in FIGS. 12A and 12B, it is possible to realize a pedal system which is sufficiently easy to operate and comfortable, as compared with the common pedal and which is capable of delivering a vehicle output based on only the pedal effort, or an automobile provided with such a pedal system.

Figure 14:
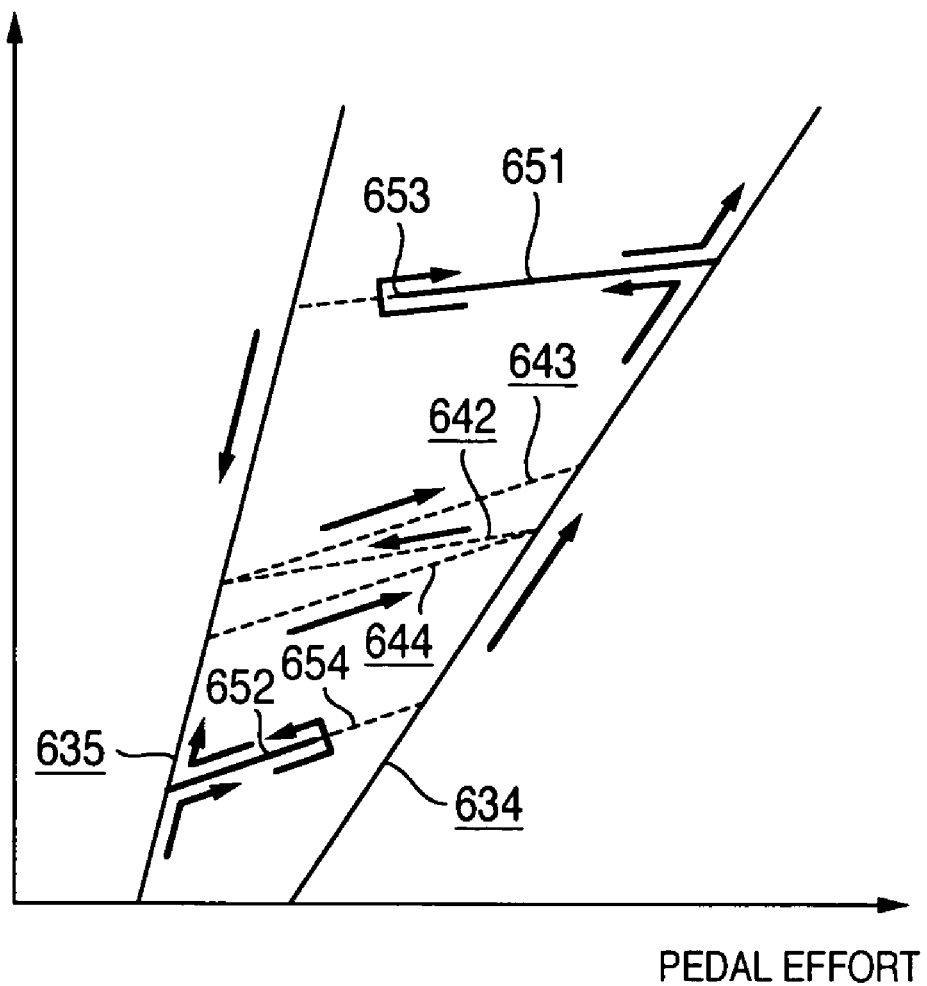
FIG. 14 is a graph showing one example of the relationship between the pedal effort and the vehicle output.

When the maintaining motion has been changed to the depressing motion or the releasing motion without change in pedal effort-increasing/decreasing direction, the relationship between the pedal effort and the vehicle output is determined depending on whether the motion is the maintaining and depressing motion or the maintaining and releasing motion. When the pedal effort-increasing/decreasing direction has been changed in the middle of the maintaining motion, however, the vehicle output is determined as shown in FIG. 14. In FIG. 14, a vehicle output 651 is provided in the period of change from the depressing motion to the maintaining motion, and in the maintaining motion, a vehicle output in the maintaining and releasing motion is provided when the pedal effort-increasing/decreasing direction is changed in a pedal effort 653 to provide the maintaining and depressing motion. In addition, a vehicle output 652 is provided in the period of change from the releasing motion to the maintaining motion, and in the maintaining motion, a vehicle output in the maintaining and depressing motion is provided when the pedal effort-increasing/decreasing direction is changed in a pedal effort 654 to provide the maintaining and releasing motion.

When the pedal effort-increasing/decreasing direction is changed in the middle of the maintaining motion, as in the vehicle output 651, the gradient or the sensitivity in the pedal effort-increasing/decreasing direction before being change is used as it is. Namely, the gradient or the sensitivity in the maintaining motion is determined based on the pedal effort-increasing/decreasing direction at the time when the motion is changed from the depressing motion or the releasing motion to the maintaining motion. Further, in general, when the motion is changed from the releasing motion to the maintaining motion, the gradient or the sensitivity of the vehicle output may be determined for the maintaining and depressing motion, irrespective of the pedal effort-increasing/decreasing direction during the maintaining motion, and when the motion is changed from the depressing motion to the maintaining motion, the gradient or the sensitivity of the vehicle output may be determined for the maintaining and releasing motion, irrespective of the pedal effort-increasing/decreasing direction during the maintaining motion. The reason why the gradient or the sensitivity of the vehicle output is not changed even if the pedal effort-increasing/decreasing direction during the maintaining and releasing motion is changed, is that when the pedal effort-increasing/decreasing direction has been frequently changed during the maintaining motion, the vehicle output is prevented from being abnormally increased or decreased by the accumulation of a difference between the gradients.

Figure 15A:
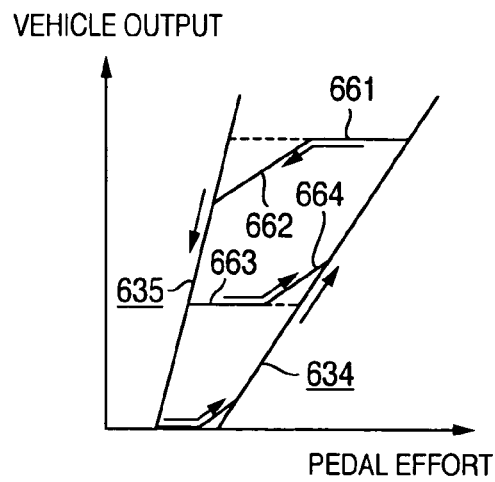
FIG. 15A to 15C are graphs each showing one example of the relationship between the pedal effort and the vehicle output.
Figure 15B:
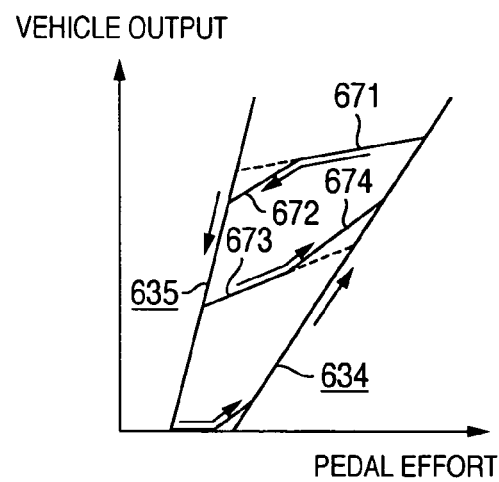
Figure 15C:
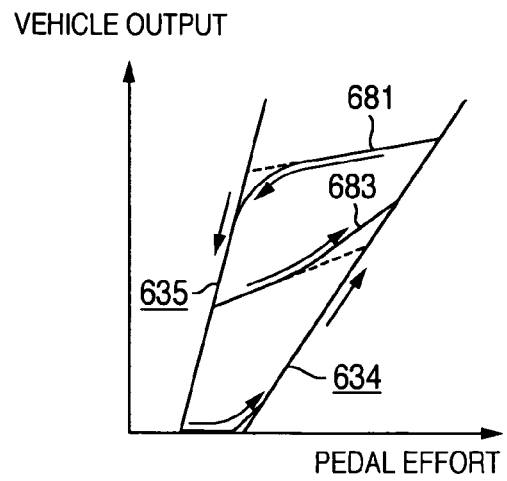

In addition, the gradient of the vehicle output may be from the middle, as shown in FIGS. 15A to 15C. In FIG. 15A, for example, a vehicle output is determined by a vehicle output profile 663 up to the middle of the maintaining and depressing motion, but may be determined by the gradient of a vehicle output profile 664 from the middle of the maintaining and depressing motion. In addition, for example, a vehicle output is determined by a vehicle output profile 661 up to the middle of the maintaining and releasing motion, but may be determined by a vehicle output profile 662 from the middle of the maintaining and releasing motion.

In FIG. 15A, the gradients (sensitivity) of the vehicle output profiles 661 and 663 are zero (0), but in FIG. 15B, a vehicle output profile originally having a sensitivity, such as vehicle output profiles 671 and 673, may be changed with its sensitivity further increased in the middle of the maintaining motion, into another vehicle output profile such as vehicle output profiles 672 and 674.

In FIG. 15A, a vehicle output is determined according to a straight line and a folded line, but when a vehicle output is determined using a curved line as in FIG. 15C, a vehicle output which is smooth and free of a sense of incompatibility can be delivered.

The sensitivity of the vehicle output relative to the pedal effort in the maintaining motion can be varied depending on the received pedal effort and the delivered vehicle output. For example, by ensuring that when the vehicle output and the pedal effort are larger, the maintaining of the vehicle output at the same level is facilitated, and when the vehicle output and the pedal effort is smaller, the adjustment of the vehicle output is facilitated, an operation such as a rapidly accelerating operation and a rapidly decelerating operation can be carried out easily, and an operability in a traveling of the vehicle following a preceding vehicle during a traffic jam and the like can be enhanced.

FIGS. 16A and 16B show one example of the relationship between the vehicle output and the pedal effort, wherein the sensitivity of the vehicle output relative to the pedal effort in the maintaining motion has been changed.

FIG. 16A shows a case where the sensitivity of the vehicle output relative to the pedal effort in the maintaining motion has been changed in accordance with the vehicle output or the pedal effort at the time when the motion has been changed from a motion other than the maintaining motion to the maintaining motion.

Here, each of sensitivities 701, 703 and 705 is a sensitivity of a vehicle output relative to a pedal effort in the maintaining and releasing motion, and each of sensitivities 702, 704 and 706 is a sensitivity of a vehicle output relative to a pedal effort in the maintaining and depressing motion, but the larger than the vehicle output or the pedal effort is, the smaller the sensitivity is set.

FIG. 16B shows a case where the sensitivity of the vehicle output relative to the pedal effort is changed even during the maintaining motion.

Here, each of sensitivities 711, 713 and 715 is a sensitivity of a vehicle output relative to a pedal effort in the maintaining releasing motion, and each of sensitivities 712, 714 and 716 is a sensitivity of a vehicle output relative to a pedal effort in the maintaining and depressing motion, but the larger than the vehicle output or the pedal effort is, the smaller the sensitivity is set, and the sensitivity is changed even during the maintaining motion.

Further, the sensitivity of the vehicle output relative to the pedal effort in the maintaining motion may be changed depending on vehicle information. For example, when the vehicle speed is higher, the sensitivity is decreased, and when the vehicle speed is smaller, the sensitivity is increased. This makes it possible to facilitate the maintaining of the vehicle output during traveling of the vehicle at a higher speed and to facilitate the adjustment of the vehicle output during traveling of the vehicle at a lower speed.

Figure 17:
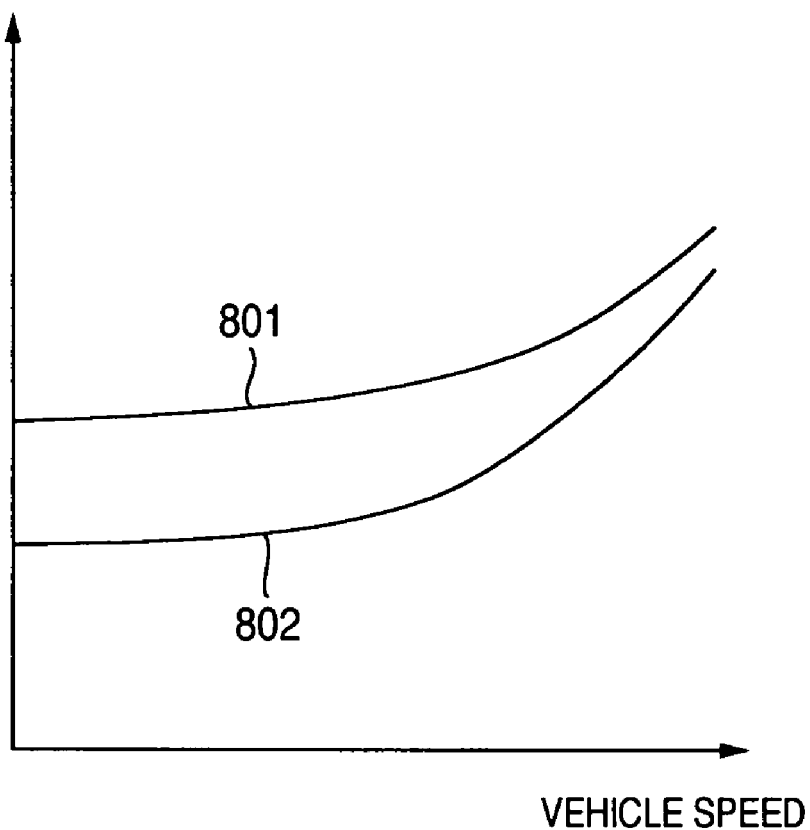
FIG. 17 is a graph showing one example of the relationship between the sensitivity and the vehicle speed.

FIG. 17 shows one example of a variation in sensitivity relative to the vehicle speed when the sensitivity has been changed in accordance with the vehicle speed. In general, it is easier to manipulate the vehicle at a sensitivity in the maintaining and depressing motion, which is increased more than a sensitivity in the maintaining and releasing motion. Therefore, the sensitivity may be set so that, for example, a sensitivity 801 indicates a relationship to the vehicle speed in the maintaining and depressing motion, and for example, a sensitivity 802 indicates a relationship to the vehicle speed in the maintaining and releasing motion. The suitable setting of the sensitivity is varied depending on the type of the subject vehicle and the sensitivities in the depressing motion and the releasing motion. In addition, the sensitivity is varied depending on the vehicle output and the pedal effort, as shown in FIG. 17.

As a simple example, when only one sensitivity in the maintaining motion is set in each of the maintaining and depressing motion and the maintaining and releasing motion, as shown in FIG. 12B, for example, a sensitivity 801 may be on the order of 0 to 0.005 G/N at a vehicle speed of 0 km/hr and on the order of 0.001 to 0.006 G/N at a vehicle speed of 50 km/hr, and for example, a sensitivity 802 may be on the order of 0 to 0.004 G/N at a vehicle speed of 0 km/hr and on the order of 0.001 to 0.005 G/N at a vehicle speed of 50 km/hr. However, the variation in sensitivity is not limited to the above range, and for example, the sensitivity may be set to be changed remarkably, for example, from a vehicle on the order of 80 to 120 km/hr, and the sensitivity of the same level may be used at a vehicle speed lower than 20 km to 50 km/hr.

Figure 18:
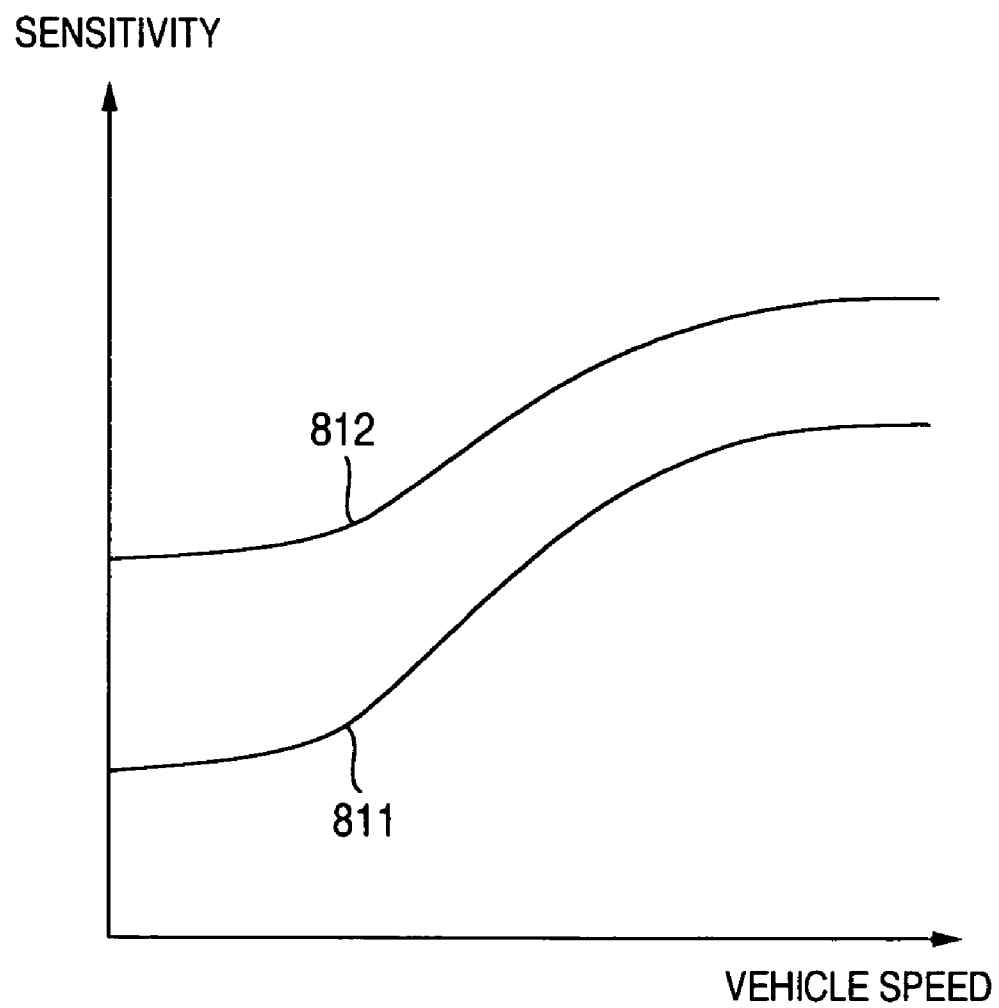
FIG. 18 is a graph showing one example of the relationship between the sensitivity and the vehicle speed.

In addition, the sensitivity of the vehicle output in the depressing motion or the releasing motion may be changed depending on the vehicle speed. As a simple example, when only one sensitivity is set in each of the depressing motion and the releasing motion, as shown in FIG. 9B, a sensitivity 811 in the depressing mode is generally higher than a sensitivity 812 in the releasing motion, as shown in FIG. 18. In addition, the lower the speed is, the lower the sensitivity, and the higher the speed, the higher the sensitivity is. The suitable setting of the sensitivity is varied depending on the type of the subject vehicle and the sensitivities in the depressing motion and the releasing motion. However, the sensitivity can be set so that, for example, at a vehicle speed smaller than 20 km/hr to 50 km/hr, the sensitivity 811 is on the order of 0.002 to 0.005 G/N, and the sensitivity 812 is on the order of 0.004 to 0.008 G/N, and at a vehicle speed larger than 80 to 120 km/hr, the sensitivity 811 is on the order of 0.003 to 0.006 G/N, and the sensitivity 812 is on the order of 0.005 to 0.01 G/N.

A vehicle output depending on the traveling state of the vehicle can be delivered by changing the sensitivities in the depressing motion, the releasing motion and the maintaining motion in accordance with the vehicle speed and hence, it is possible to realize a pedal system which is easy to operate. In a pedal system in which the sensitivity is varied depending on the vehicle speed, it is possible to suppress the deterioration of the operability due to the change in pedal effort caused by the influence of an inertial force, for example, provided by an acceleration or a deceleration. When the travel speed is larger, a larger acceleration or a deceleration may be required in some cases, but a required vehicle output can be delivered by changing the sensitivity depending on the vehicle speed.

By application of the invention as described above, it is possible to realize an automobile provided with a pedal system which is capable of generating a vehicle output based on a pedal effort, irrespective of a pedal travel, which is operable by a driver and in which the driver is difficult to become tired.

The present invention is applied to the relationship of the vehicle output to the pedal effort mainly in the maintaining motion in a pedal system adapted to deliver the vehicle output based on the pedal effort. In a pedal which not stroked or little stroked, the present invention is necessarily applied by the structural reason that the pedal travel is not changed, but even in a pedal which is stroked and a pedal premised on the change in pedal travel, if the vehicle output is delivered based on only the pedal effort, the present invention is completely likewise applicable.

(Embodiment 2)

The present invention relates to a pedal system which is adapted to deliver a vehicle output based on a pedal effort and to which a vehicle output device is not mechanically connected, or which is not premised on the mechanical connection to the vehicle output device.

However, to generate a main effect of the present invention, the pedal system is necessarily not needed to include an actuator. Namely, the present invention is likewise applicable to a pedal system in which the pedal travel is restrained by a mechanical construction.

Diagrammatic illustrations of pedals as Example 2 to which the present invention is applicable are shown in FIGS. 19A to 19C. In FIG. 19A, a pedal 901 is fixed relative to a reference plane 905 of a vehicle (a driver's seat), so that the pedal travel is not changed at all, or not changed to a degree or more corresponding to a strain or chattering of a structure. Here, the pedal effort may be detected by a sensor 902 placed on a surface of the pedal 901 or by a sensor 903 placed between the pedal 901 and a structure 904 or on the structure 904.

FIG. 19B shows an arrangement in which a spring member 911 or a damper member 912 is mounted between a pedal 901 and a structure 904, so that a pedal reaction force is generated upon the depression of the pedal, and a stroke of a pedal travel restrained on a locus consistent relative to a reference plane 905.

FIG. 19C shows a mechanism in which a pedal 901 includes an arm 923, and a stroke simulator 922 generates a pedal reaction force by a rod 921 connected to the arm 923. The stroke simulator 922 generates a pedal reaction force depending on the movement of the rod 921 by a hydraulic or mechanical spring member or sliding member. The sensor 924 is mounted by the rod 921 and capable of measuring a pedal effort or a pedal reaction force.

The pedal system shown in each of FIGS. 19A, 19B and 19C is not provided with an actuator, but is provided with the sensor capable of a pedal effort as a pedal effort-detecting means. It is possible to apply the present invention and to exhibit a main effect of the present invention by delivering a vehicle output based on a pedal effort detected by the sensor or a force corresponding to the pedal effort.

As discussed above, according to the present invention, it is possible to realize an automobile provided with a pedal system in which no sense of discomfort is provided to a driver delivering a vehicle output based on a pedal effort, and which is easy to operate and capable of providing a comfortable driving operation.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A pedal system for a vehicle, comprising a pedal and a pedal effort-detecting means for detecting a pedal effort applied to said pedal, said pedal system delivering a vehicle output command to at least one of a braking output device for generating a braking force for the vehicle and a driving output device for generating a driving force for the vehicle based on the pedal effort detected by said pedal effort-detecting means, wherein said pedal system further includes a motional state-judging means for detecting a motional state of either a depressing motion, releasing motion or a maintaining motion, based on the pedal effort detected by said pedal effort-detecting means, and at least a portion of the relationship between the pedal effort and the vehicle output command in the depressing motion or the releasing motion is represented by a straight line (linear) or a folded line.

2. A pedal system according to claim 1, wherein
the vehicle output command in the maintaining motion is kept constant, irrespective of the pedal effort.

3. A pedal system according to claim 1, wherein
the vehicle output command in the maintaining motion has a sensitivity relative to the pedal effort.

4. A pedal system according to claim 1, wherein
the vehicle output command is kept constant up to the middle of the maintaining motion, irrespective of the pedal effort, and has a sensitivity relative to the pedal effort from the middle of the maintaining motion.

5. A pedal system for a vehicle according to claim 3, wherein when the pedal effort is increased in the maintaining motion (depressing and maintaining motion), or when the pedal effort is decreased in the maintaining motion (releasing and maintaining motion), the sensitivity of the vehicle output command is changed, and when the depressing direction is changed in the middle of the maintaining motion, the sensitivity of the vehicle output command relative to the pedal effort depending on the depressing direction before being changed is maintained.

6. A pedal system for a vehicle according to claim 3, wherein when the motion is changed from the depressing motion to the maintaining motion and when the motion is changed from the releasing motion to the maintaining motion, the sensitivity of the vehicle output command relative to the pedal effort in the maintaining motion is changed.

7. A pedal system for a vehicle according to claim 3, wherein the sensitivity of the vehicle output command relative to the pedal effort in the maintaining motion is varied depending on the vehicle output command.

8. A pedal system for a vehicle according to claim 3, wherein the sensitivity of the vehicle output command relative to the pedal effort in the maintaining motion is varied depending on the pedal effort.

9. A pedal system for a vehicle according to claim 3, wherein the sensitivity of the vehicle output command relative to the pedal effort in the maintaining motion is varied depending on the vehicle speed.

10. A pedal system for a vehicle according to claim 1, wherein the sensitivity of the vehicle output command relative to the pedal effort in the depressing motion or in the releasing motion is varied depending on the vehicle speed.

11. A pedal system for a vehicle according to claim 1, wherein said pedal is not stroked at all, or little stroked.

12. A pedal system for a vehicle according to claim 1, wherein said pedal is an accelerator pedal or a brake pedal.

13. A vehicle system comprising a pedal, a pedal effort-detecting means for detecting a pedal effort applied to said pedal, and at least one of a braking output device for generating a braking force for the vehicle and a driving output device for generating a driving force for the vehicle for delivering a vehicle output, said vehicle system delivering a vehicle output or a vehicle output command based on the pedal effort detected by said pedal effort-detecting means, wherein
- said vehicle system further includes a motional state-judging means for detecting a motional state of either a depressing motion, releasing motion or a maintaining motion, based on the pedal effort detected by said pedal effort-detecting means, and
- at least a portion of the relationship between the pedal effort in the depressing motion or the releasing motion and the vehicle output or the vehicle output command is represented by a straight line (linear) or a folded line.

14. A vehicle system according to claim 13, wherein
the vehicle output or the vehicle output command in the maintaining motion is kept constant, irrespective of the pedal effort.

15. A vehicle system according to claim 13, wherein
the vehicle output or the vehicle output command in the maintaining motion has a sensitivity relative to the pedal effort.

16. A vehicle system according to claim 13, wherein
the vehicle output or the vehicle output command is kept constant up to the middle of the maintaining motion, irrespective of the pedal effort, and has a sensitivity relative to the pedal effort from the middle of the maintaining motion.

17. A vehicle system for a vehicle according to claim 15, wherein when the pedal effort is increased in the maintaining motion (depressing and maintaining motion), or when the pedal effort is decreased in the maintaining motion (releasing and maintaining motion), the sensitivity of the vehicle output or the vehicle output command relative to the pedal effort is changed, and when the depressing direction is changed in the middle of the maintaining motion, the sensitivity of the vehicle output command relative to the pedal effort depending on the depressing direction before being changed is maintained.

18. A vehicle system according to claim 15, wherein when the motion is changed from the depressing motion to the maintaining motion and when the motion is changed from the releasing motion to the maintaining motion, the sensitivity of the vehicle output or the vehicle output command relative to the pedal effort in the maintaining motion is changed.

19. A vehicle system according to claim 15, wherein the sensitivity of the vehicle output or the vehicle output command relative to the pedal effort in the maintaining motion is varied depending on the vehicle output or the vehicle output command.

20. A vehicle system according to claim 15, wherein the sensitivity of the vehicle output or the vehicle output command relative to the pedal effort in the maintaining motion is varied depending on the pedal effort.

21. A vehicle system according to claim 15, wherein the sensitivity of the vehicle output or the vehicle output command relative to the pedal effort in the maintaining motion is varied depending on the vehicle speed.

22. A vehicle system according to claim 13, wherein the sensitivity of the vehicle output or the vehicle output command relative to the pedal effort in the depressing motion or in the releasing motion is varied depending on the vehicle speed.

23. A vehicle system according to claim 13, wherein said pedal is not stroked at all, or little stroked.

24. A vehicle system according to claim 13, wherein said pedal is an accelerator pedal or a brake pedal.

* * * * *